US012686008B2

(12) United States Patent
Camsund

(10) Patent No.: US 12,686,008 B2
(45) Date of Patent: Jul. 21, 2026

(54) MICROFLUIDIC DEVICE HAVING SPECIFICALLY DESIGNED DETECTION CHAMBERS

(71) Applicant: Bifrost Biosystems Inc., Berkeley, CA (US)

(72) Inventor: Daniel Camsund, Uppsala (SE)

(73) Assignee: Bifrost Biosystems Inc., Berkeley, CA (US)

( * ) Notice: Subject to any disclaimer, the term of this patent is extended or adjusted under 35 U.S.C. 154(b) by 855 days.

(21) Appl. No.: 17/998,585

(22) PCT Filed: May 11, 2021

(86) PCT No.: PCT/SE2021/050450
§ 371 (c)(1),
(2) Date: Nov. 11, 2022

(87) PCT Pub. No.: WO2021/230799
PCT Pub. Date: Nov. 18, 2021

(65) Prior Publication Data
US 2023/0182135 A1 Jun. 15, 2023

(30) Foreign Application Priority Data
May 14, 2020 (SE) .................................... 2030160-2

(51) Int. Cl.
*B01L 3/00* (2006.01)

(52) U.S. Cl.
CPC . *B01L 3/502753* (2013.01); *B01L 2200/0647* (2013.01); *B01L 2300/0681* (2013.01); *B01L 2300/0864* (2013.01)

(58) Field of Classification Search
CPC ....... B01L 3/502753; B01L 2200/0647; B01L 2300/0681; B01L 2300/0864;
(Continued)

(56) References Cited

U.S. PATENT DOCUMENTS 9,115,340 B2 8/2015 Zhang et al.
10,041,104 B2 8/2018 Elf et al.
(Continued)

FOREIGN PATENT DOCUMENTS

CN 109991423 A 7/2019
WO 2013/130714 9/2013
(Continued)

OTHER PUBLICATIONS

Extended European Search Report for European Patent Application No. 21805037 dated May 28, 2024 (8 pages).
(Continued)

*Primary Examiner* — Jennifer Wecker
*Assistant Examiner* — Britney N. Washington
(74) *Attorney, Agent, or Firm* — Fox Rothschild LLP; Carol E. Thorstad-Forsyth

(57) ABSTRACT

There is provided a microfluidic device (10) comprising a microfluidic structure having multiple spatially defined cell capturing channels (2) configured for enabling growth of cells or genetic libraries of cells or cell strains that are capable of producing or secreting compounds. The microfluidic structure of the microfluidic device (10) further comprises multiple spatially defined detection chambers (1; 1A) configured to receive and accommodate target entities. Each of the detection chambers (1) is configured for fluid connection with at least one of the cell capturing channels (2), and has a selective barrier (3A) defined between the detection chamber (1; 1A) and the respective cell capturing channel or channels (2) and adapted for allowing flow of at least one of the compounds from the respective cell capturing channel or channels (2) into the detection chamber (1; 1A) enabling the target entities in the detection chamber to be exposed to said at least one compound, while stopping
(Continued)

cells or target entities from passing through the selective barrier (3A).

20 Claims, 20 Drawing Sheets

(58) Field of Classification Search
CPC ..... B01L 2200/0668; B01L 2300/0816; B01L 2400/0487; C12M 23/16; G01N 33/5005; G01N 33/5008; C12Q 1/02
See application file for complete search history.

(56) References Cited

U.S. PATENT DOCUMENTS

| | | | | |
|---|---|---|---|---|
| 10,725,024 | B2 * | 7/2020 | Ricicova | G01N 33/5052 |
| 2005/0241941 | A1 * | 11/2005 | Parce | G01N 33/502 204/600 |
| 2010/0136551 | A1 | 6/2010 | Cho et al. | |
| 2014/0087456 | A1 * | 3/2014 | Lim | G01N 33/491 435/309.1 |
| 2016/0146823 | A1 * | 5/2016 | Chiu | G01N 15/1456 506/9 |
| 2016/0324991 | A1 | 11/2016 | Sia et al. | |
| 2020/0316600 | A1 | 10/2020 | Elf et al. | |

FOREIGN PATENT DOCUMENTS

| | | |
|---|---|---|
| WO | 2014/031997 | 2/2014 |
| WO | 2014/153651 | 10/2014 |
| WO | 2016/077735 | 5/2016 |
| WO | 2017/156634 | 9/2017 |
| WO | 2018/010929 | 1/2018 |
| WO | 2019/088904 | 5/2019 |
| WO | 2020/092975 | 5/2020 |

OTHER PUBLICATIONS

Baltekin et al., "Antibiotic susceptibility testing in less than 30 min using direct single-cell imaging," PNAS 114:34, 9170-9175 (2017).
Cama et al., "Single-cell microfluidics facilitates the rapid quantification of antibiotic accumulation in Gramnegative bacteria," Lab Chip. 20, 2765, 11 pages (2020).
Camsund et al., "Time-resolved Imaging-based CRISPRi Screening," Nat Meth, 17, 86-92 (2020).
Chang et al., "Antibiotic Susceptibility Test with Surface-Enhanced Raman Scattering in a Microfluidic System," Anal Chem., 91, 10988-10995 (2019).
Deng et al., "The heterologous expression strategies of antimicrobial peptides in microbial systems," Prot Expr Pur, 140, 52-59 (2017).
Dura et al., "Profiling lymphocyte interactions at the single-cell level by microfluidic cell pairing," Nat Comm, 6:5940, 13 pages (2015).
Ke et al., "In situ Sequencing for RNA Analysis in Preserved Tissue and Cells.," Nat Meth, 10:9 (2013).
Khasa et al., "Kinetic studies of constitutive human granulocytemacrophage colony stimulating factor (hGM-CSF) expression in continuous culture of Pichia pastoris," Biotechnol Lett, 29, 1903-1908 (2007).
Kim et al., "Recent Developments of Chip-based Phenotypic Antibiotic Susceptibility Testing," BioChip J., 13(1), 43-52 (2019).
Knappe et al., "Oncocin (VDKPPYLPRPRPPRRIYNR-NH2): A Novel Antibacterial Peptide Optimized against Gram-Negative Human Pathogens," J Med Chem, 53, 5240-5247 (2010).
Larsson et al., "In situ Genotyping Individual DNA Molecules by Target-primed Rolling-circle Amplification of Padlock Probes," Nat Meth 1:3, 227-232 (2004).
Lawson et al., "In situ Genotyping of a Pooled Strain Library after Characterizing Complex Phenotypes," Mol Syst Biol, 13:947, 9 pages (2017).
Li et al., "Microfluidics Cell Loading-Dock System: Ordered Cellular Array for Dynamic Lymphocyte—Communication Study," Adv Biosys, 1, 1700085, 10 pages (2017).
Paulova et al., "Use of a mixture of glucose and methanol as substrates for the production of recombinant trypsinogen in continuous cultures with Pichia pastoris Mut+," J Biotech, 157, 180-188 (2012).
Puxbaum et al., "The bud tip is the cellular hot spot of protein secretion in yeasts," Appl Microbiol Biotechnol, 100, 8159-8168 (2016).
Silva et al., "Clavanin A Improves Outcome of Complications from Different Bacterial Infections," Antimicrob Agents Chemother, 59, 1620-1626 (2015).
Xu et al., "Two routes to senescence revealed by real-time analysis of telomerase-negative single lineages," Nat Comm, 6, 7680, 10 pages (2015).
Zhang et al., "Maximization of Production of Secreted Recombinant Proteins in Pichia pastoris Fed-Batch Fermentation," Chem. Sci., 21, 386-393 (2005).
Zhang et al., "Microfluidic systems for rapid antibiotic susceptibility tests (ASTs) at the single-cell level," Biotechnol Prog, 21, 386-393 (2005).
Zhou et al., "Evaluation of Single-Cell Cytokine Secretion and Cell-Cell Interactions with a Hierarchical Loading Microwell Chip," Cell Rep 31, 107574, 29 pages (2020).

* cited by examiner

100

10

A method for loading a microfluidic device

MICROFLUIDIC DEVICE HAVING SPECIFICALLY DESIGNED DETECTION CHAMBERS

CROSS REFERENCE TO RELATED APPLICATIONS

This application is a U.S. National Phase Application of PCT International Application No. PCT/SE2021/050450, filed on May 11, 2021, which is an International Application of and claims the benefit of priority to Swedish Patent Application No. 2030160-2, filed on May 14, 2020, the entire contents of which are herein incorporated by reference.

TECHNICAL FIELD

The present invention relates to a microfluidic device, a method for loading a microfluidic device, a method for analyzing characteristics of objects such as cells, target entities and/or compounds by using a microfluidic device, and an analysis system comprising a microfluidic device.

BACKGROUND

The discovery of new candidate biopharmaceuticals, or other bioactive compounds that can be made by cells, requires lots of manual labor and is a costly process. Present high-throughput screening technologies offer a solution. But these usually automated platforms, which are complicated to set up, require the availability of the compounds to be tested. This entails the separate construction of production cell strains plus expression and purification of each biopharmaceutical to be tested, or if possible, the chemical synthesis of each compound. Taken together, this makes also high-throughput screening expensive.

In contrast, efficient synthetic biology methods enable the pooled synthesis and cloning of libraries of genes for novel biopharmaceuticals. In combination with pooled high-throughput screening technologies such as phage display, this facilitates efficient testing and discovery of biopharmaceuticals that act through binding a specific target (e.g. therapeutic antibodies). However, for compounds where specific binding is not their main activity (e.g. antibiotics), or whose activity causes an effect that must be studied by microscopy (e.g. changes in cell morphology or dynamic processes that has to be followed with precision over time), phage display and similar screening technologies cannot be used. Instead, it is often necessary to use microscopy-based high-throughput screening technologies where the effects are studied directly on living cells in defined locations. When searching for desired cell phenotypes using pooled libraries of cells with different genetic variants/perturbations and microscopy-based screening assays, individual cells with desired effects can be identified using barcodes that can be read by imaging. An example of such an imaging-based screening technology is DuMPLING (Dynamic u-fluidic Microscopy Phenotyping of a Library before IN situ Genotyping) [1], [2].

References [3] and [4] relate to a type of microfluidic device that can be referred to as a cell trapping machine, which is suitable for DuMPLING-based screening.

Reference [5] relates to another microfluidic continuous flow device adapted for retaining biological material.

However, there is a general need for continued development with regard to improved biotechnological applications such as those mentioned above and other applications, and it is therefore envisaged that new types of microfluidic devices have to be developed.

SUMMARY

It is a general object to provide an improved microfluidic device, especially useful for biotechnological applications and/or for allowing efficient analysis of cells, compounds and other objects/entities.

It is also desirable to provide an overall analysis system including such a microfluidic device.

Another object is to provide a method for loading a microfluidic device as well as a method for analyzing characteristics of objects such as cells, target entities and/or compounds by using a microfluidic device.

These objects are met by one or more embodiments of the present invention.

According to a first aspect, there is provided a microfluidic device. The microfluidic device comprises a substrate having multiple spatially defined and separated cell capturing channels configured to receive and accommodate cells, wherein each of the cell capturing channels is configured for fluid connection with a first common flow input/output channel. The microfluidic device is characterized in that the substrate of the microfluidic device further comprises multiple spatially defined and separated detection chambers configured to receive and accommodate target entities. Each of the detection chambers is in direct fluid connection with at least one of the cell capturing channels, and has a first selective barrier or filter structure defined between the detection chamber and the respective cell capturing channel or channels and adapted for allowing passage of fluid and objects smaller than a first dimension, while hindering passage of objects equal to or larger than the first dimension to pass through the first selective barrier or filter structure. Each of the detection chambers is further configured for fluid connection with a second common flow input/output channel, and has a second selective barrier or filter structure defined at an interconnection between the detection chamber and the second common flow input/output channel and adapted for allowing passage of fluid and objects smaller than a second dimension into the second common flow input/output channel, while hindering passage of objects equal to or larger than the second dimension to pass through the second selective barrier or filter structure.

According to a second aspect, there is provided a microfluidic device. The microfluidic device comprises a microfluidic structure having multiple spatially defined cell capturing channels configured for enabling growth of cells or genetic libraries of cells or cell strains that are capable of producing or secreting compounds. The microfluidic device is characterized in that the microfluidic structure of the microfluidic device further comprises multiple spatially defined detection chambers configured to receive and accommodate target entities. Each of the detection chambers is configured for fluid connection with at least one of the cell capturing channels, and has a selective barrier defined between the detection chamber and the respective cell capturing channel or channels and adapted for allowing flow of at least one of the compounds from the respective cell capturing channel or channels into the detection chamber, enabling the target entities in the detection chamber to be exposed to the compound or compounds, while stopping cells or target entities from passing through the selective barrier. The microfluidic device is structurally configured for enabling monitoring, in at least one of the detection chambers, of the target entities and/or the compound(s) and/or interaction between the target entities and the compound(s).

According to a third aspect, there is provided a method for loading a microfluidic device according to the first aspect or the second aspect. The method comprises inputting target entities in a fluid port of the microfluidic device and transporting at least part of the target entities into the detection chambers through liquid flow; and inputting cells in a fluid port of the microfluidic device and transporting at least part of the cells into the cell capturing channels through liquid flow.

According to a fourth aspect, there is provided a method for analyzing characteristics of objects such as cells, target entities and/or compounds by using a microfluidic device according to the first aspect or the second aspect.

According to a fifth aspect, there is provided an analysis system comprising a microfluidic device according to the first aspect or the second aspect.

This constitutes a new microfluidic chip and procedure, e.g. for pooled screening of compounds produced or secreted by cells, for example biopharmaceuticals, where the problems of compound production, purification and high-throughput testing may be solved simultaneously.

By way of example, the novel microfluidic device enables monitoring of target entities interacting with or exposed to one or more compounds produced or secreted by cells and/or monitoring of one or more the compounds and/or monitoring of objects produced by target entities.

The proposed technology is sometimes referred to as a Secretion-Effect-Detection (SED) technology, e.g. for allowing production and secretion of compounds from genetic libraries of cells and the characterization of the secreted compounds or their effects in a fluidic device. This entails designing a new type of microfluidic device, e.g. where detection chambers with target entities to be studied are uniquely coupled to cell capturing channels.

Other advantages of the invention will be appreciated when reading the below detailed description.

BRIEF DESCRIPTION OF DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
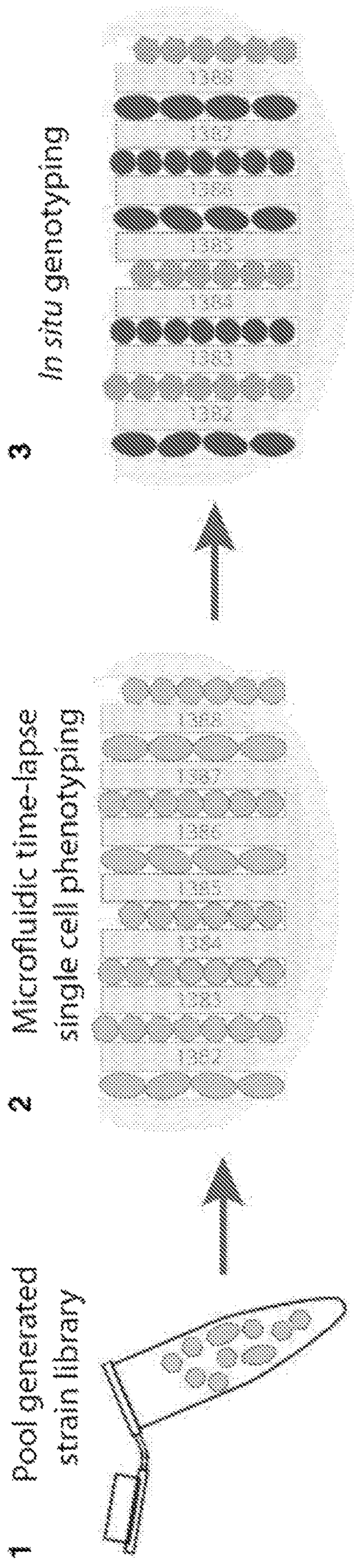
FIG. 1 is a schematic diagram illustrating an example of the so-called DuMPLING screening technique.

FIG. 1 is a schematic diagram illustrating an example of the conventional screening technique called DuMPLING screening. First, a pooled strain library is generated where each unique library variant is labelled with a unique genetic barcode. Secondly, the single-cell phenotypes of the library are recorded by time-lapse microscopy in a translucent microfluidic chip where each numbered trap contains a single strain. Thirdly, after phenotyping is complete, the cells are fixed, and the genotypes are determined in situ to connect a specific phenotype to a specific genotype. For more information on the DuMPLING screening technique, reference can be made to [1, 2] as well as patent references [3, 4].

Figure 2:
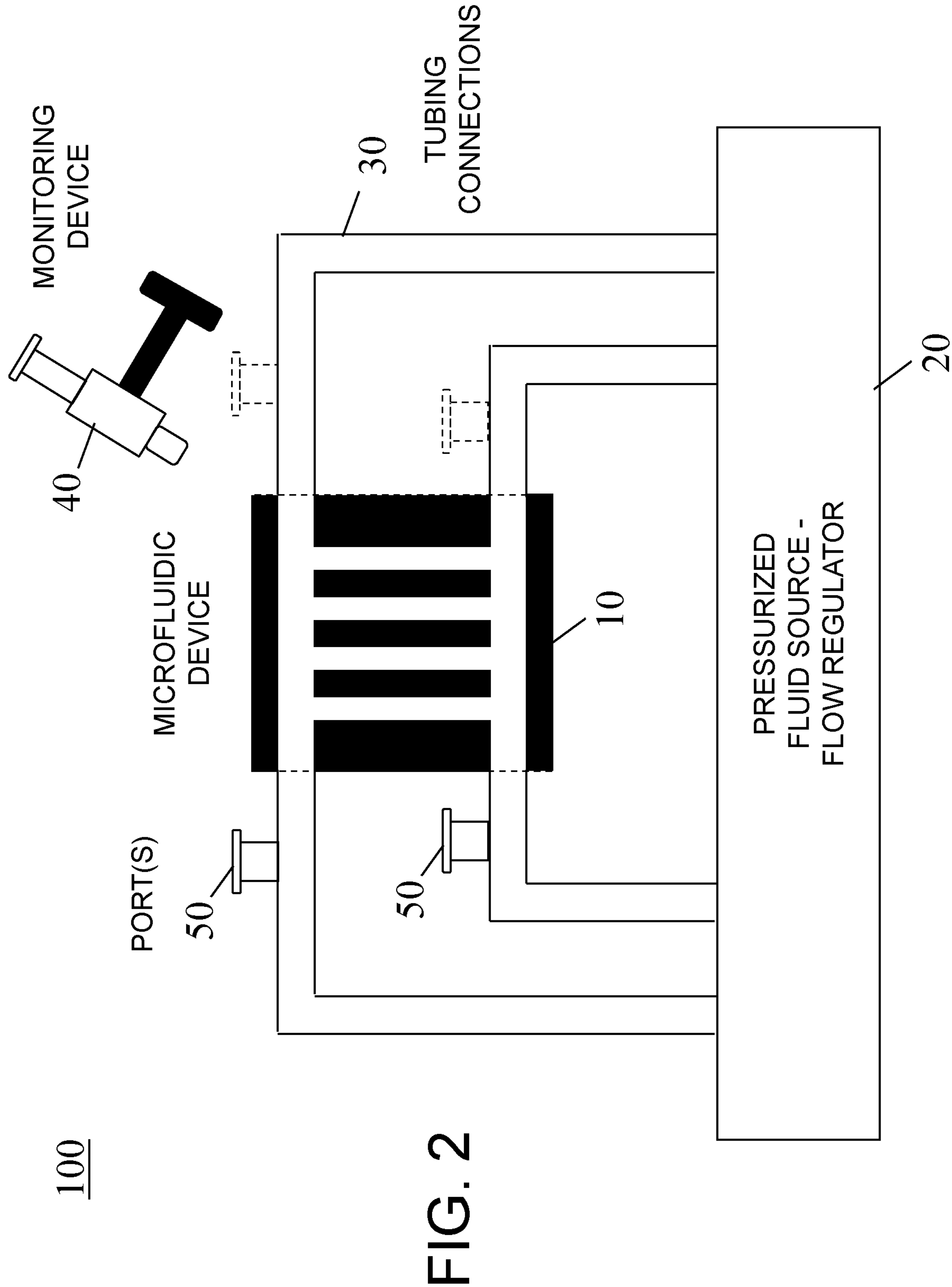
FIG. 2 is a schematic diagram illustrating an example of a biotechnological analysis system comprising a microfluidic device.

FIG. 2 is a schematic diagram illustrating an example of a biotechnological analysis system comprising a microfluidic device. Basically, the analysis system 100 includes a microfluidic device 10, and a pressurized fluid source/flow regulator 20 connected to the microfluidic device 10 via tubing connections 30. The pressurized fluid source/flow regulator 20 is configured for operation according to well-accepted technology. A monitoring device 40 may be provided for enabling monitoring of events in at least selected parts of the microfluidic device 10. By way of example, time-lapse microscopy may be used for monitoring. One or more ports 50 for loading of suitable liquids and/or fluids, chemicals, cells and/or other objects into the microfluidic device 10 may be arranged in connection with the microfluidic device, e.g. via the tubing connections 30. The port(s) 50 may also be used for extracting or washing out liquid medium and/or waste.

Figure 3:
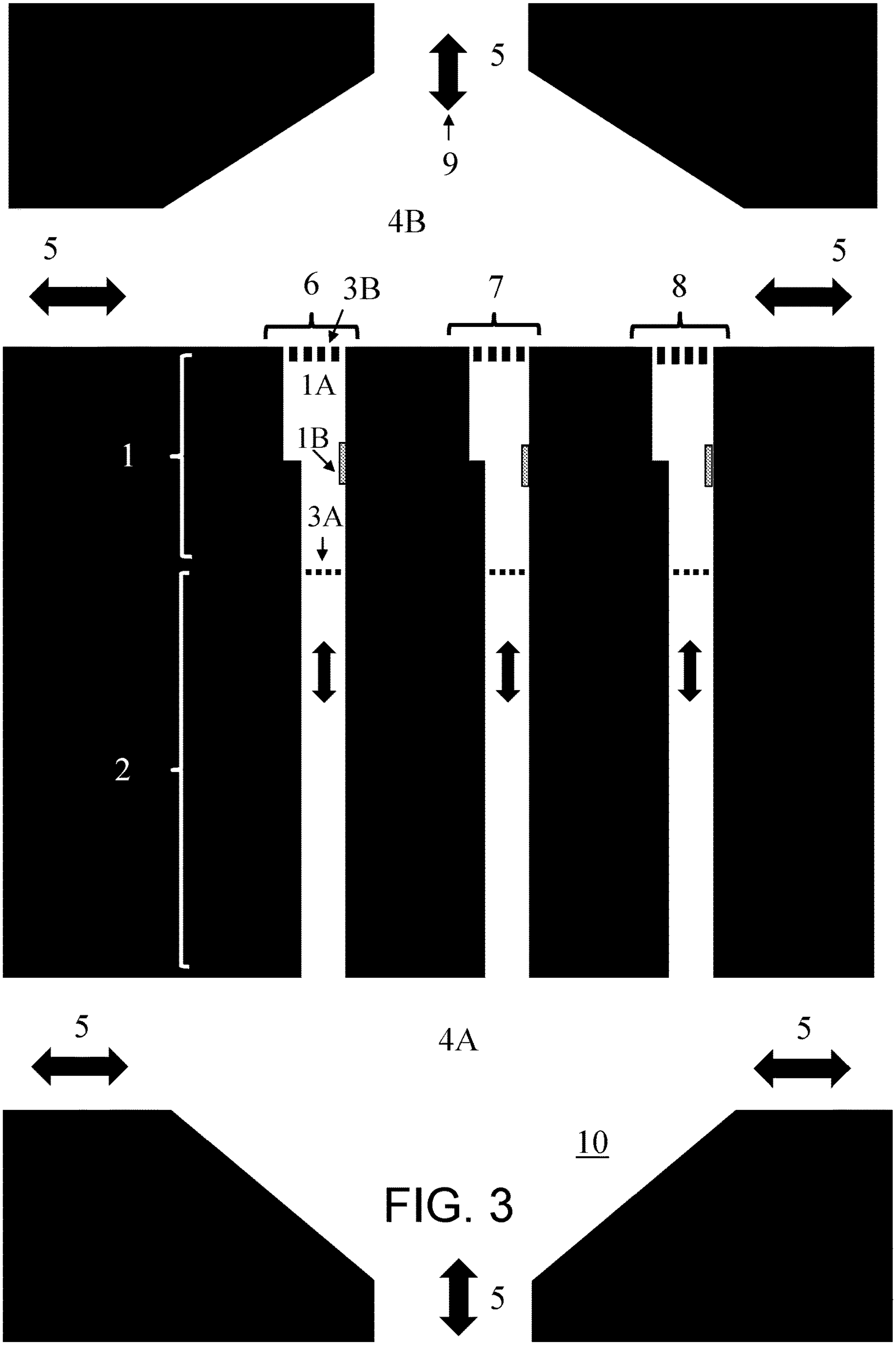
FIG. 3 is a schematic diagram illustrating an example of a microfluidic device according to an embodiment.
Figure 4:
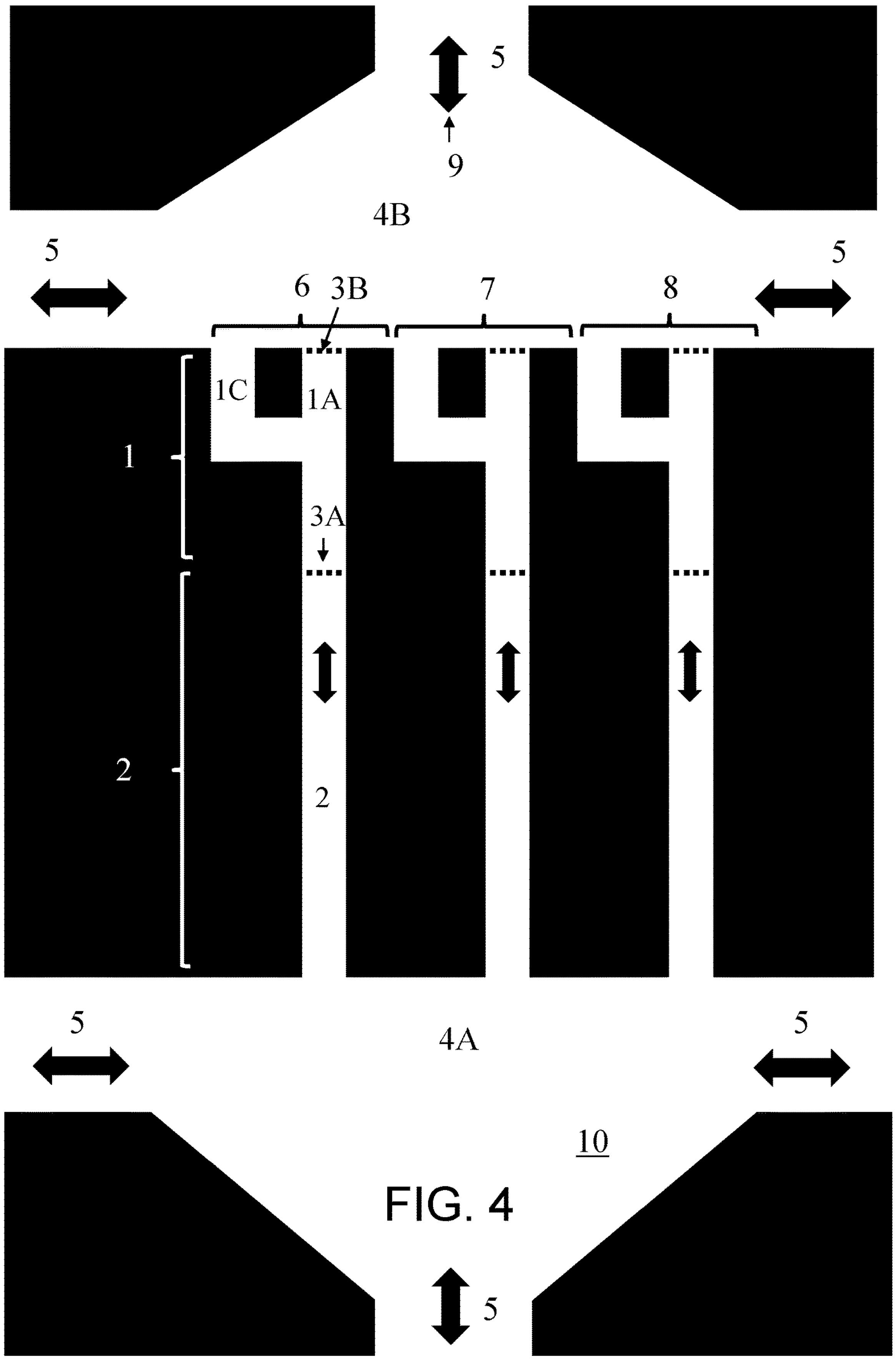
FIG. 4 is a schematic diagram illustrating another example of a microfluidic device according to an embodiment.

FIG. 3 and FIG. 4 are schematic diagrams illustrating two examples of a microfluidic device.

In general, the microfluidic device 10 comprises a substrate having multiple spatially defined and separated cell capturing channels 2 configured to receive and accommodate cells, wherein each of the cell capturing channels 2 is configured for fluid connection with a first common flow input/output channel 4A. The microfluidic device 10 is characterized in that the substrate of the microfluidic device further comprises multiple spatially defined and separated detection chambers 1; 1A configured to receive and accommodate target entities. Each of the detection chambers 1; 1A is in direct fluid connection with at least one of the cell capturing channels 2, and has a first selective barrier or filter structure 3A defined between the detection chamber 1; 1A and the respective cell capturing channel or channels 2 and adapted for allowing passage of fluid and objects smaller than a first dimension, while hindering passage of objects equal to or larger than the first dimension to pass through the first selective barrier or filter structure. Each of the detection chambers 1 is further configured for fluid connection with a second common flow input/output channel 4B, and has a second selective barrier or filter structure 3B defined at an interconnection between the detection chamber 1; 1A and the second common flow input/output channel 4B and adapted for allowing passage of fluid and objects smaller than a second dimension into the second common flow input/output channel 4B, while hindering passage of objects equal to or larger than the second dimension to pass through the second selective barrier or filter structure 3B.

It can be noted that the term cell capturing channel is sometimes referred to as a cell trap or a mother machine trap, or simply trap. These terms are used interchangeably throughout this disclosure, but normally imply a channel-like structure having channel dimensions including a channel width and a channel length.

In a sense, each detection chamber and its associated cell capturing channel can be regarded as integrally formed in the substrate of the microfluidic device, with a "seamless" interface that enables direct fluid connection therebetween.

The term detection chamber may, but does not necessarily imply a channel-like structure, as long as the detection chamber is connectable to a cell capturing channel.

By way of example, the first selective barrier or filter structure 3A may be adapted for allowing passage of fluid and objects, including at least one compound produced or secreted by the cells, that are smaller than the cells and the target entities, while hindering passage of cells and target entities to pass through the first selective barrier or filter structure 3A.

For example, the objects that are smaller than the cells and the target entities may include molecules, molecular complexes, particles, compounds having a size smaller than the cells and the target entities.

By way of example, the second selective barrier or filter structure 3B may be adapted for allowing passage of fluid and objects smaller than the target entities into the second common flow input/output channel 4B, while hindering passage of target entities to pass through the second selective barrier or filter structure 3B.

For example, the objects that are smaller than the target entities include molecules, molecular complexes, particles, compounds having a size smaller than the target entities.

In a particular example, the first dimension lies in the interval [1 nm, 10 μm] and the second dimension lies in the interval [1 nm, 100 μm].

In another example, the first dimension lies in the interval [20 nm, 10 μm] and the second dimension lies in the interval [20 nm, 100 μm].

In yet another example, the first dimension lies in the interval [100 nm, 5 μm] and the second dimension lies in the interval [100 nm, 10 μm].

In still another example, the first dimension lies in the interval [200 nm, 2 μm] and the second dimension lies in the interval [200 nm, 10 μm].

For example, it is possible, although not necessary, that the first dimension corresponds to or is equal to the second dimension.

In general, the microfluidic device is adapted and dimensioned so as to enable accommodation of the considered objects such as cells, target entities and compounds. In other words, the microfluidic device is applicable for use with objects such as cells, target entities and compounds that have a dimension allowing accommodation of the objects within the device.

In a particular example embodiment, each one of at least a subset of the detection chambers 1; 1A has an access port 1B for enabling loading of said target entities into the detection chambers 1, e.g. as illustrated in FIG. 3.

Alternatively, in a preferred example embodiment, each one of at least a subset of the detection chambers 1; 1A has at least one access channel 1C configured for fluid connection with the detection chamber 1; 1A and configured for fluid connection with the second common flow input/output channel 4B, e.g. as illustrated in FIG. 4.

It should be understood that the proposed technology encompasses many different practical variations of the actual dimensions and structural configuration of the microfluidic structures such as the detection chambers, cell capturing channels and/or access channels.

FIG. 5 to FIG. 14 illustrate a few examples of such variations for practical implementation.

Figure 5:
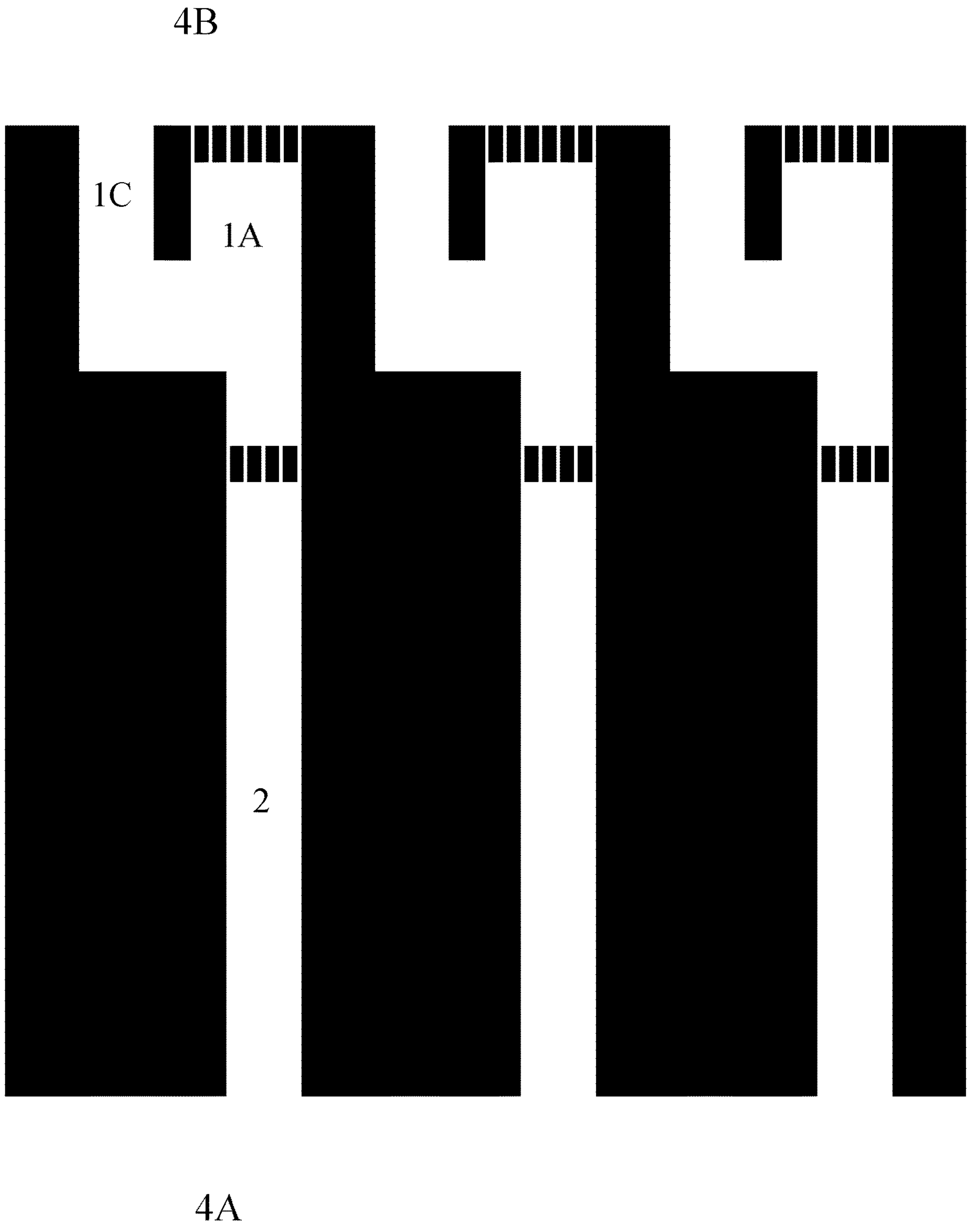
FIG. 5 is a schematic diagram illustrating an example of a microfluidic device according to an embodiment, in which the detection chamber has the same (width) dimension or possibly a slightly larger (width) dimension than the corresponding cell capturing channel.

FIG. 5 is a schematic diagram illustrating an example of a microfluidic device according to an embodiment, in which the detection chamber has the same (width) dimension or possibly a slightly larger (width) dimension than the corresponding cell capturing channel.

Figure 6:
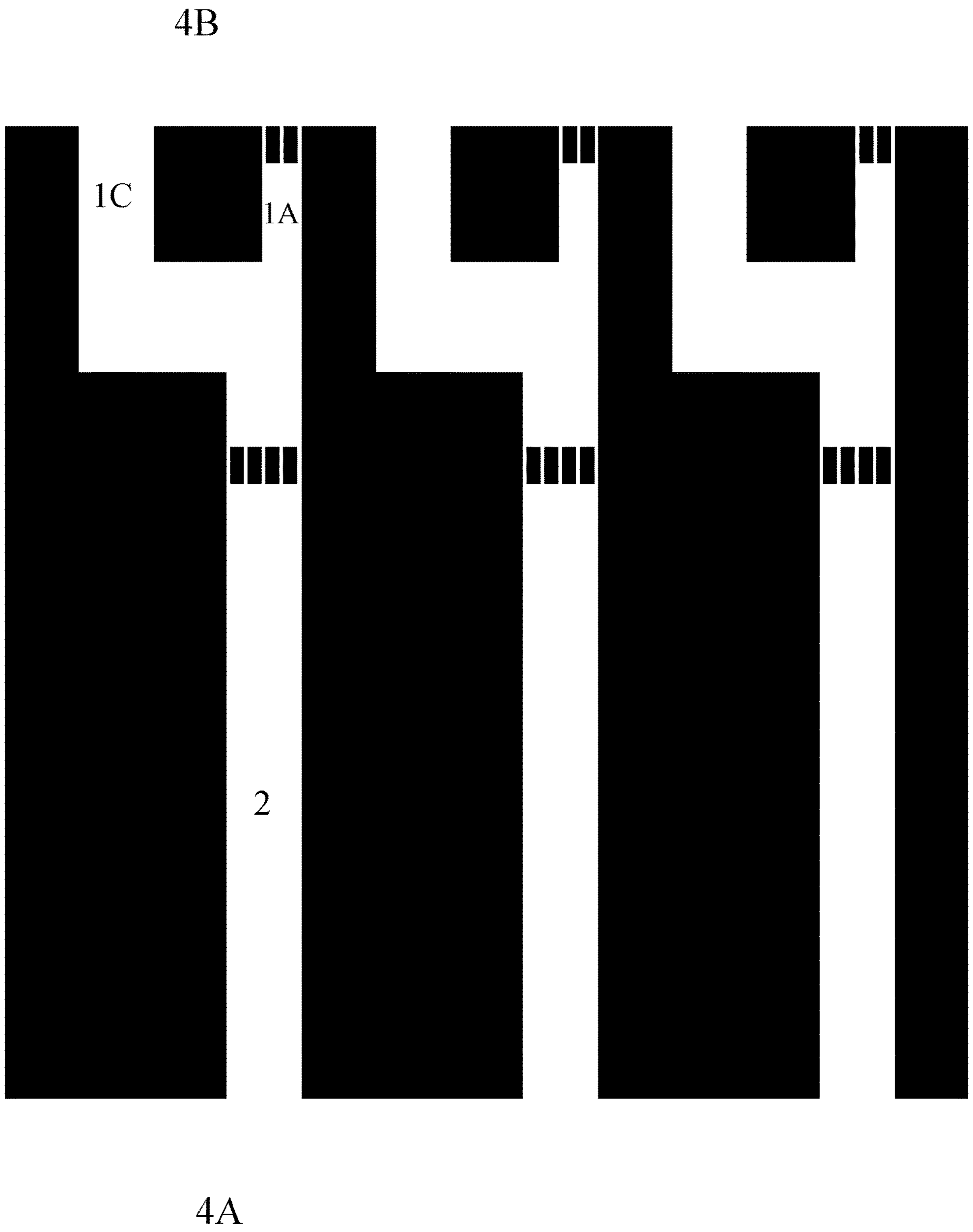
FIG. 6 is a schematic diagram illustrating an example of a microfluidic device according to an embodiment, in which the detection chamber has a smaller (width) dimension than the corresponding cell capturing channel, while the access channel has the same (width) dimension as the cell capturing channel.

FIG. 6 is a schematic diagram illustrating an example of a microfluidic device according to an embodiment, in which the detection chamber has a smaller (width) dimension than the corresponding cell capturing channel, while the access channel has the same (width) dimension as the cell capturing channel.

Figure 7:
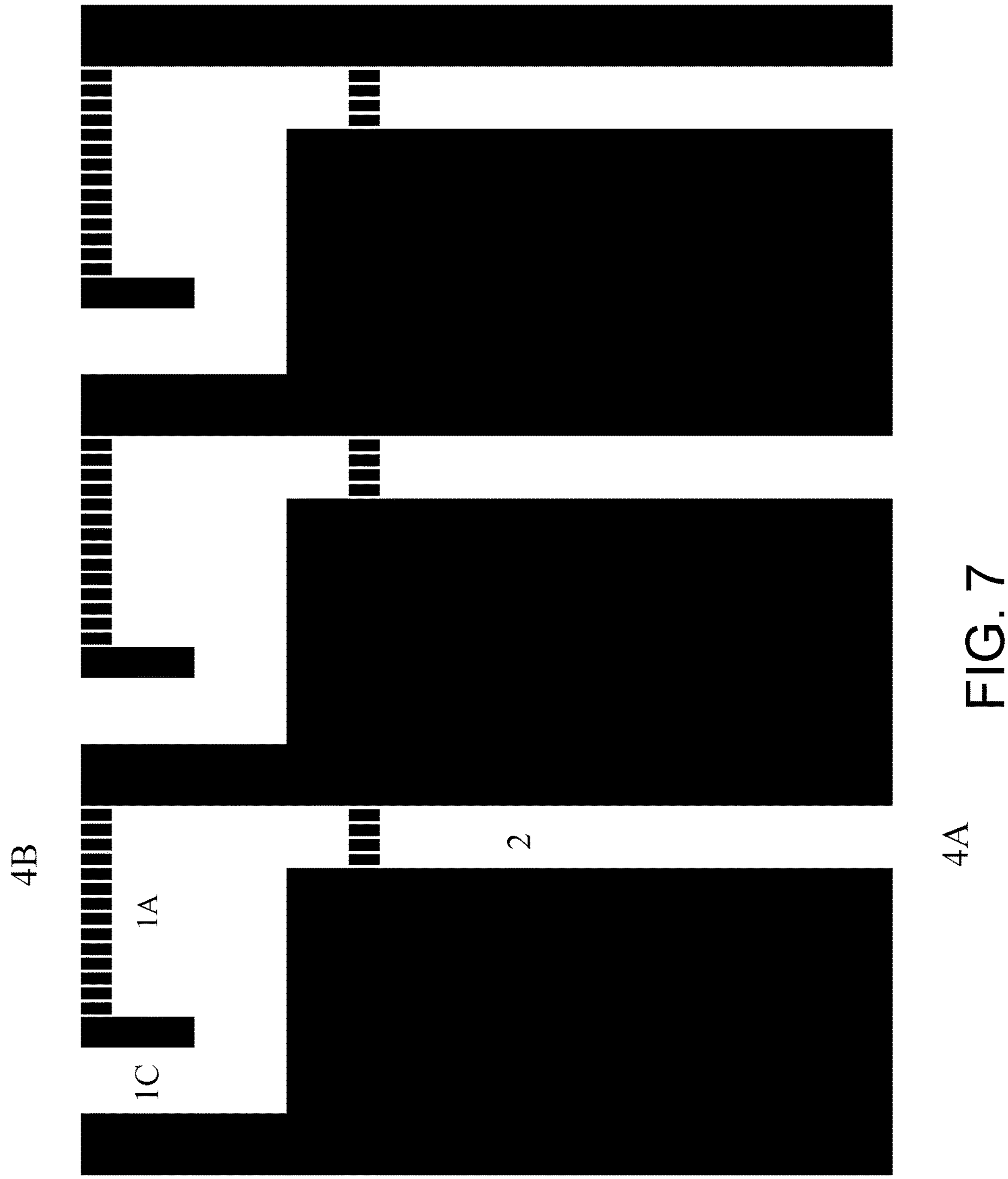
FIG. 7 is a schematic diagram illustrating an example of a microfluidic device according to an embodiment, in which the detection chamber has a significantly larger (width) dimension than the corresponding cell capturing channel, while the access channel has the same (width) dimension as the cell capturing channel.

FIG. 7 is a schematic diagram illustrating an example of a microfluidic device according to an embodiment, in which the detection chamber has a significantly larger (width) dimension than the corresponding cell capturing channel, while the access channel has the same (width) dimension as the cell capturing channel.

Figure 8:
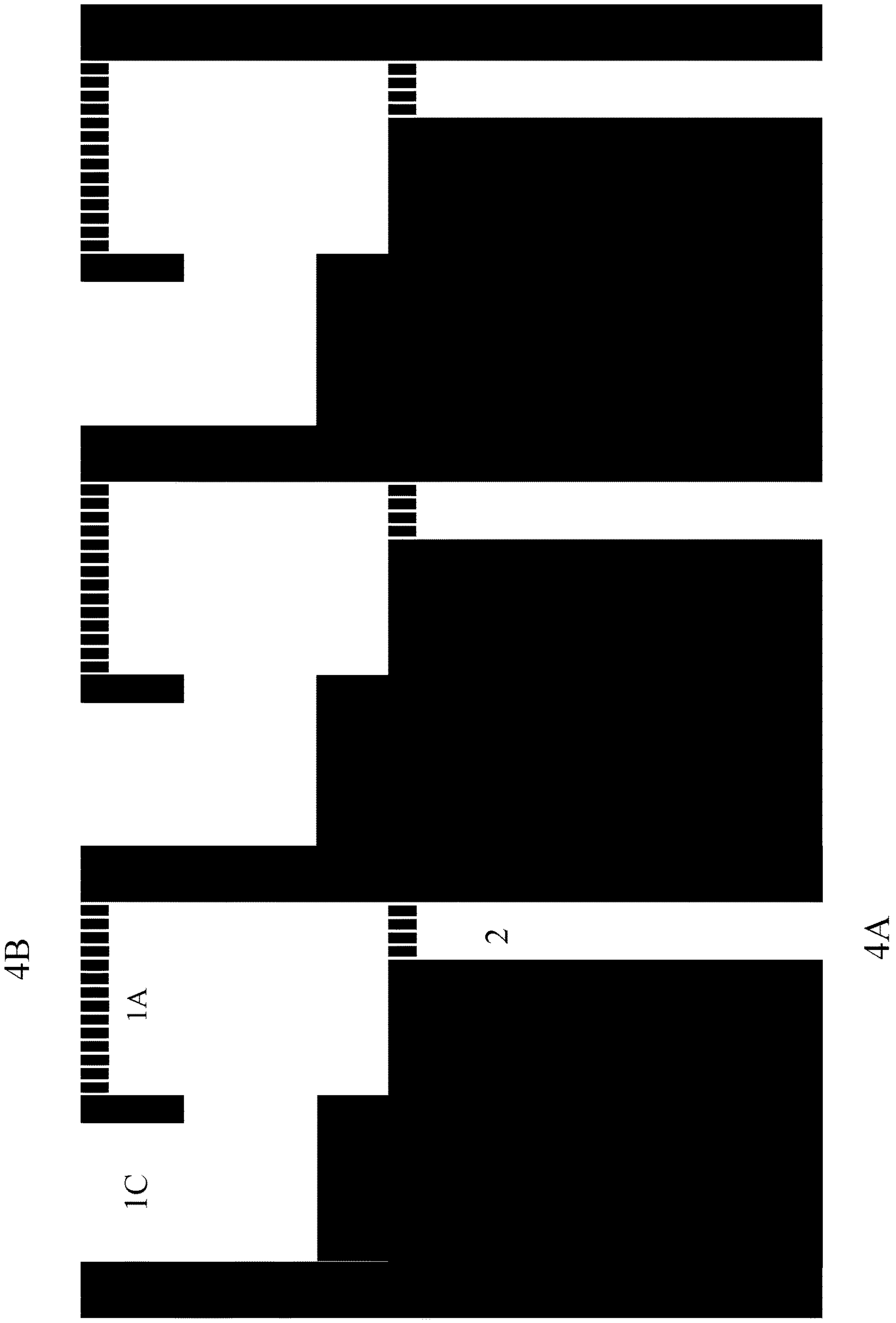
FIG. 8 is a schematic diagram illustrating an example of a microfluidic device according to an embodiment, in which the both detection chamber and the corresponding access channel have a significantly larger (width) dimension than the corresponding cell capturing channel.

FIG. 8 is a schematic diagram illustrating an example of a microfluidic device according to an embodiment, in which the both detection chamber and the corresponding access channel have a significantly larger (width) dimension than the corresponding cell capturing channel.

Figure 9:
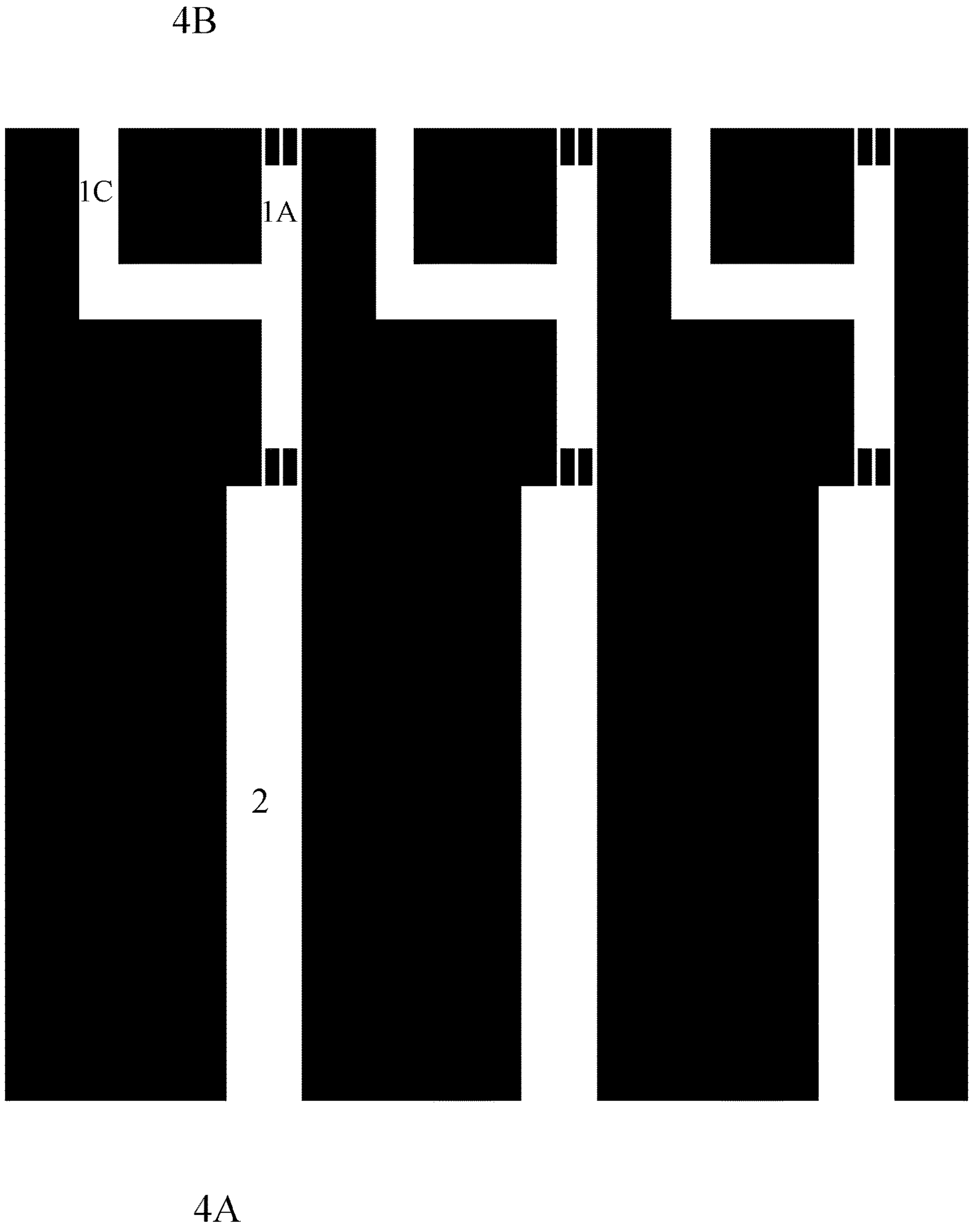
FIG. 9 is a schematic diagram illustrating an example of a microfluidic device according to an embodiment, in which the both detection chamber and the corresponding access channel have a smaller (width) dimension than the corresponding cell capturing channel.

FIG. 9 is a schematic diagram illustrating an example of a microfluidic device according to an embodiment, in which the both detection chamber and the corresponding access channel have a smaller (width) dimension than the corresponding cell capturing channel.

Figure 10:
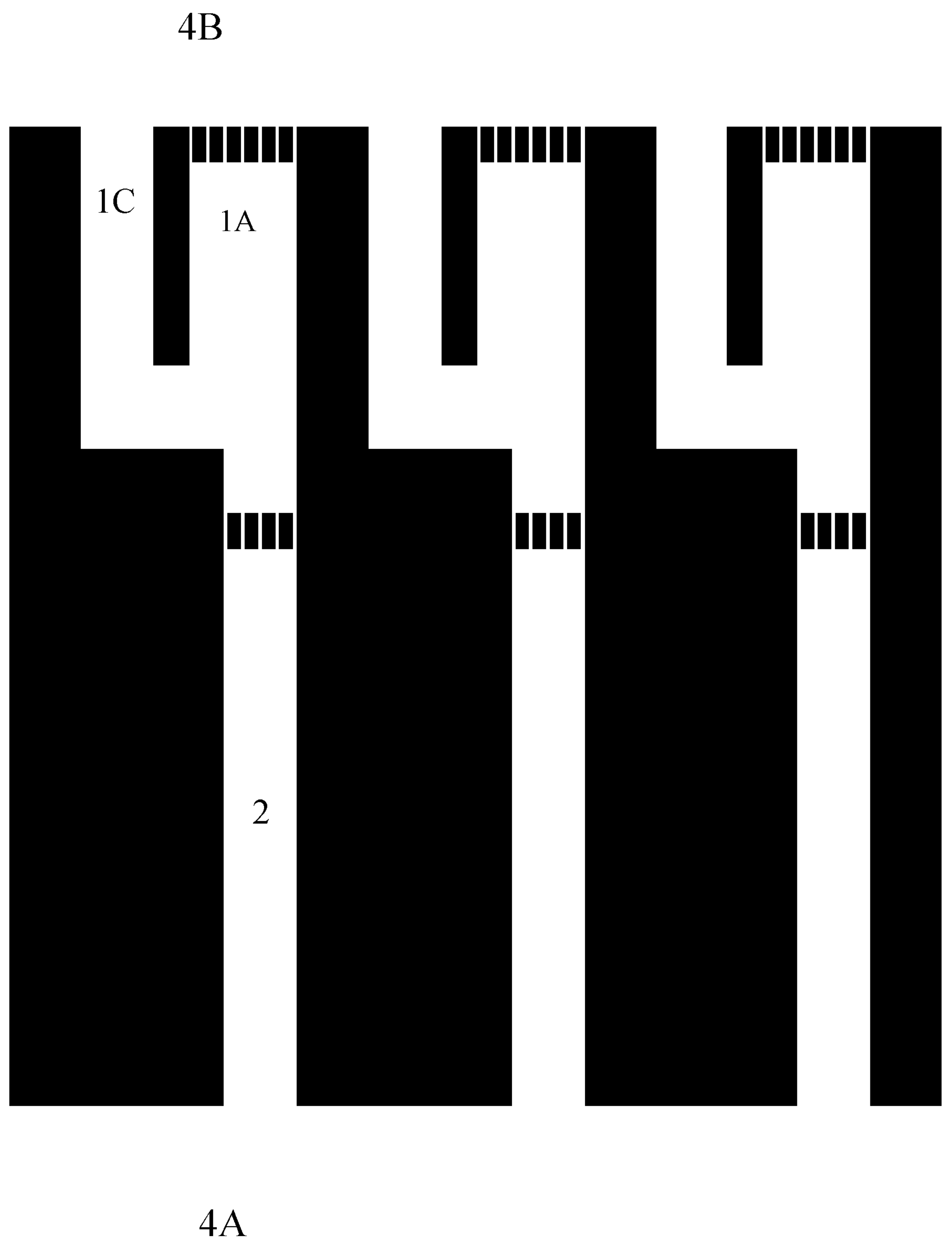
FIG. 10 is a schematic diagram illustrating an example of a microfluidic device according to an embodiment, in which the detection chamber and the corresponding access channel have a longer length extension along the channel direction than the detection chamber and the access channel of FIG. 5.

FIG. 10 is a schematic diagram illustrating an example of a microfluidic device according to an embodiment, in which the detection chamber and the corresponding access channel have a longer length extension along the channel direction than the detection chamber and the access channel of FIG. 5.

Figure 11:
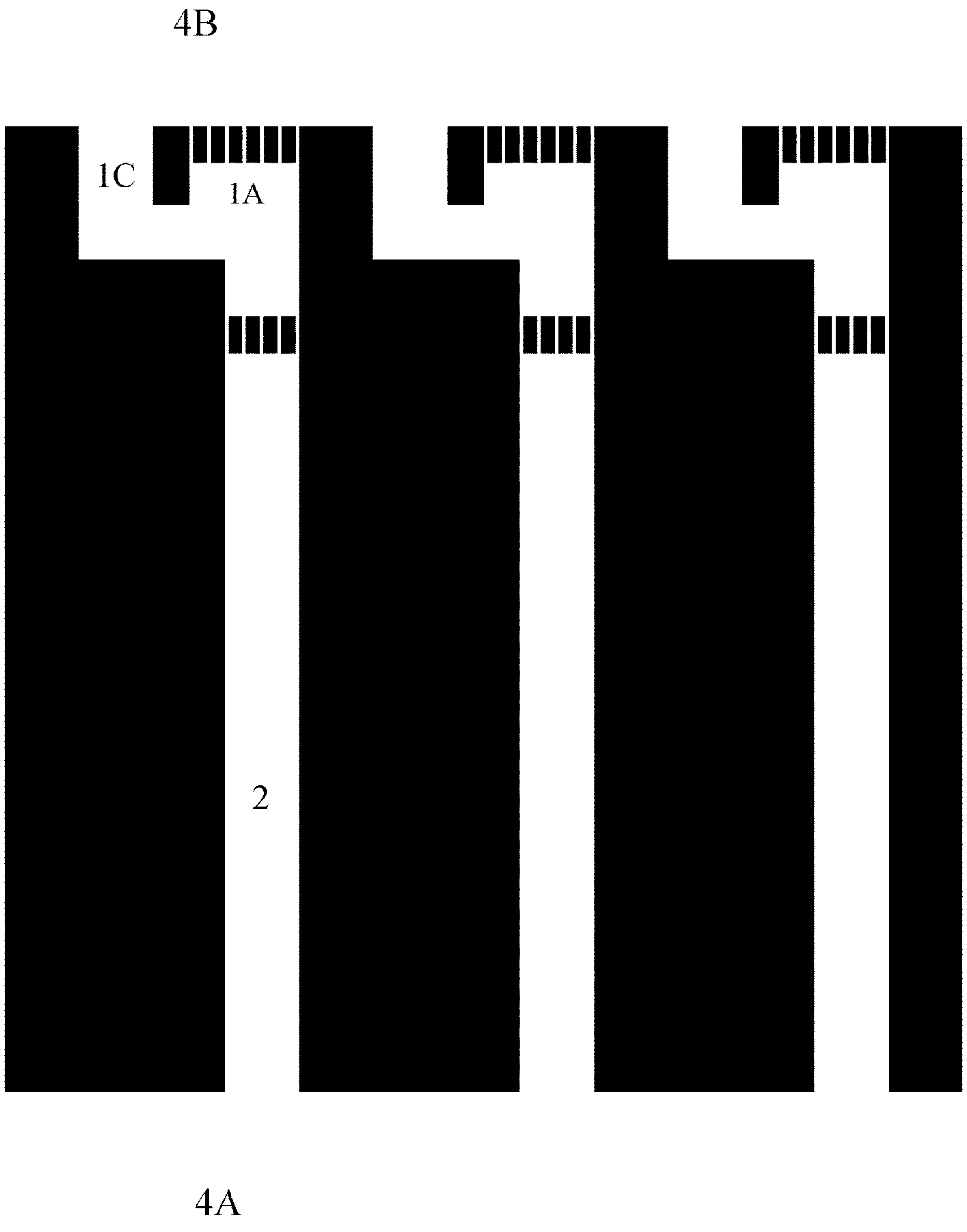
FIG. 11 is a schematic diagram illustrating an example of a microfluidic device according to an embodiment, in which the detection chamber and the corresponding access channel have a shorter length extension along the channel direction than the detection chamber and the access channel of FIG. 5.

FIG. 11 is a schematic diagram illustrating an example of a microfluidic device according to an embodiment, in which the detection chamber and the corresponding access channel have a shorter length extension along the channel direction than the detection chamber and the access channel of FIG. 5.

Figure 12:
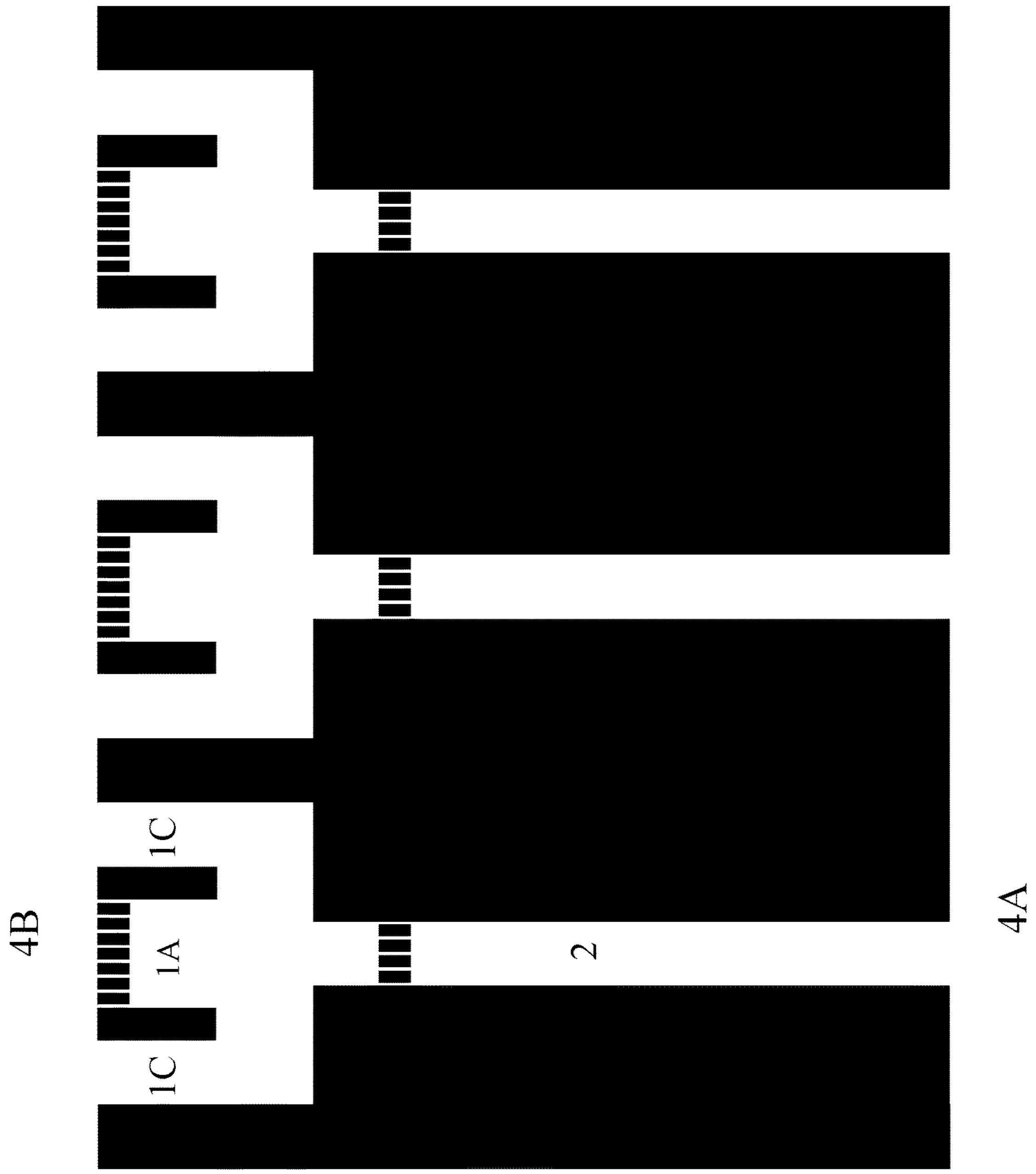
FIG. 12 is a schematic diagram illustrating an example of a microfluidic device according to an embodiment, in which each detection chamber has more than one access channel.

FIG. 12 is a schematic diagram illustrating an example of a microfluidic device according to an embodiment, in which each detection chamber has more than one access channel.

Figure 13:
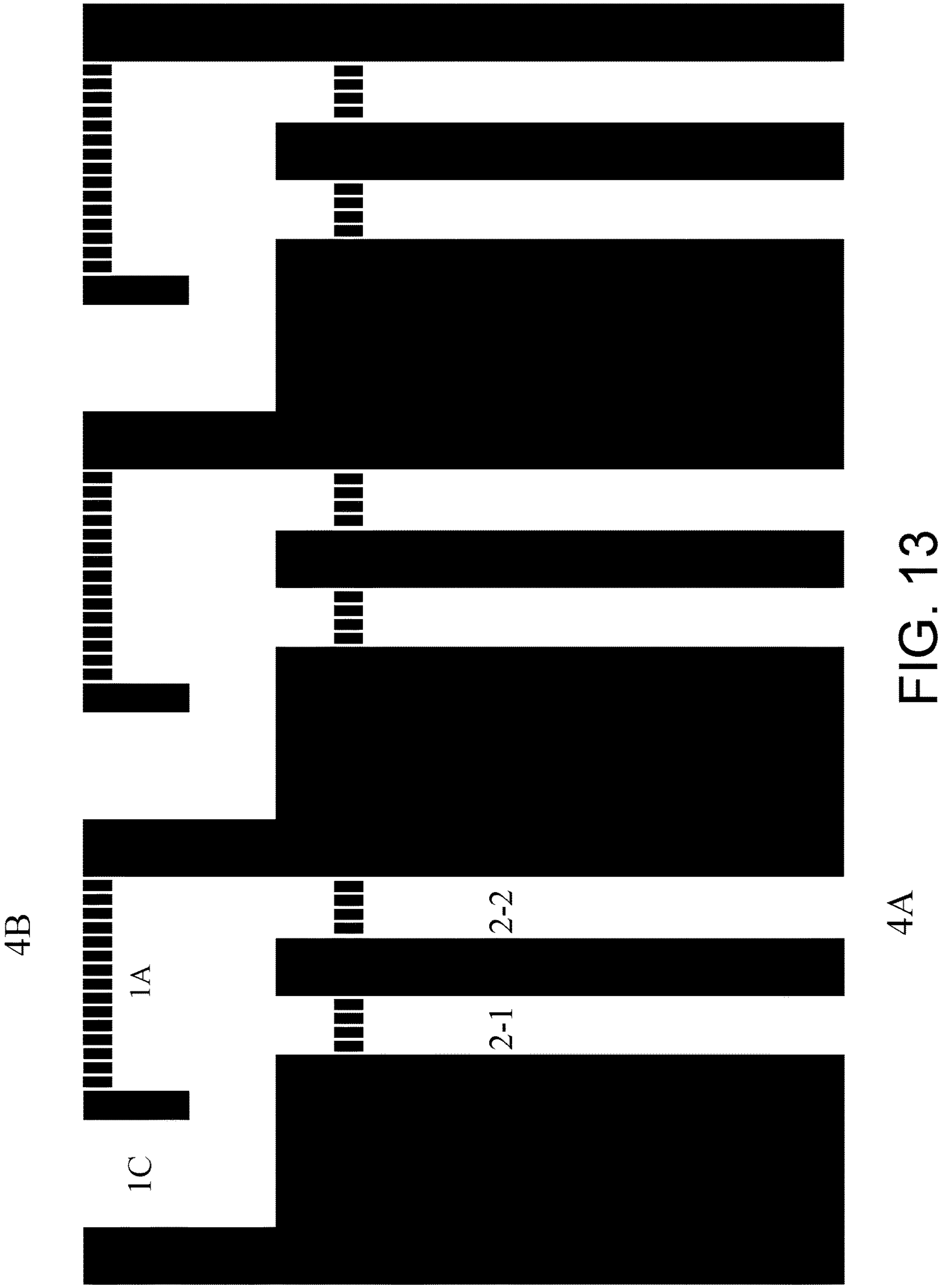
FIG. 13 is a schematic diagram illustrating an example of a microfluidic device according to an embodiment, in which each detection chamber is in fluid connection with more than one cell capturing channel.

FIG. 13 is a schematic diagram illustrating an example of a microfluidic device according to an embodiment, in which each detection chamber is in fluid connection with more than one cell capturing channel.

Figure 14:
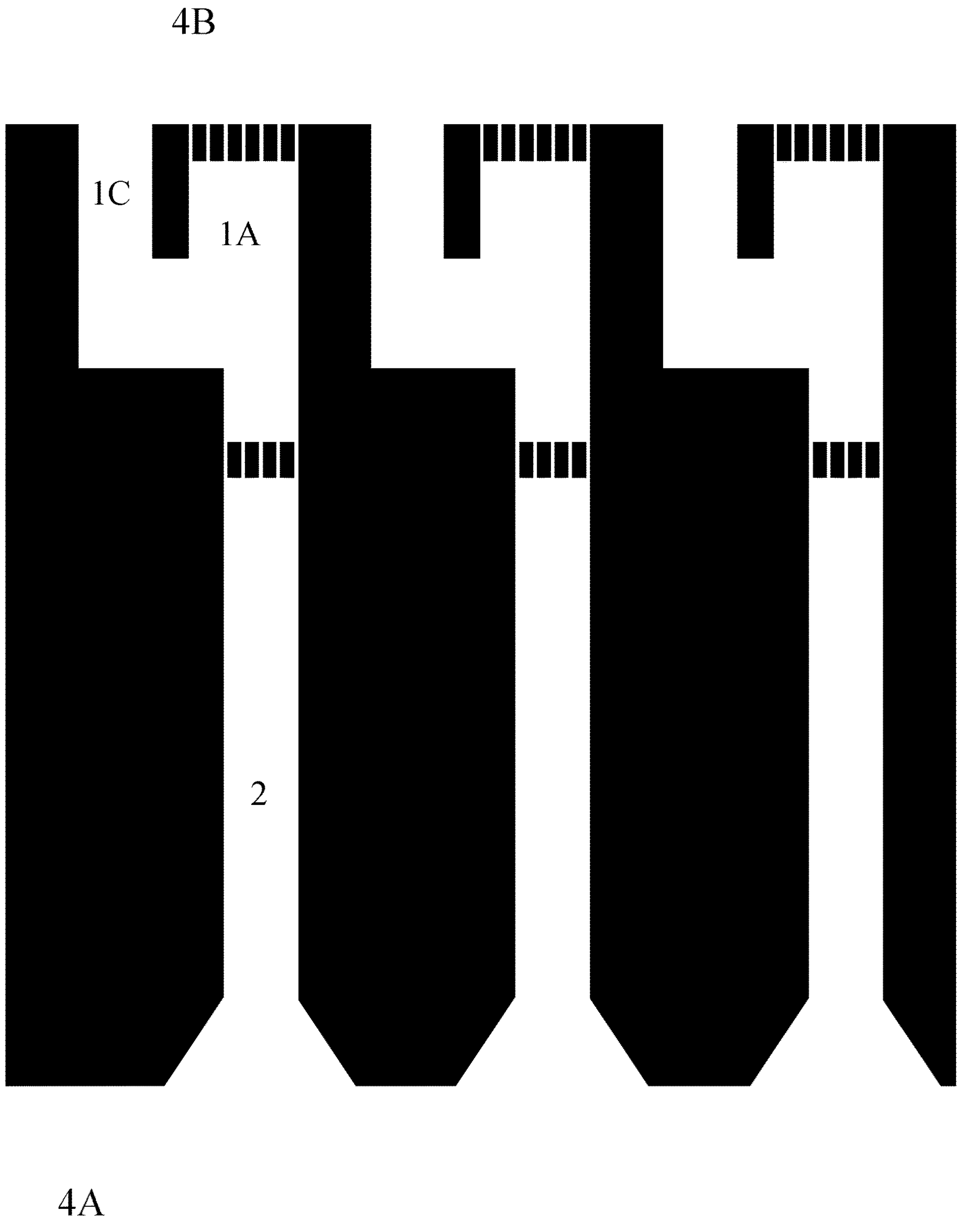
FIG. 14 is a schematic diagram illustrating an example of a microfluidic device according to an embodiment, in which at least a subset of the multiple spatially defined and separated cell capturing channels have a wider inflow section.

FIG. 14 is a schematic diagram illustrating an example of a microfluidic device according to an embodiment, in which at least a subset of the multiple spatially defined and separated cell capturing channels have a wider inflow section.

As an example, each one of at least a subset of the detection chambers 1; 1A may have multiple access channels 1C configured for fluid connection with the detection chamber 1; 1A and configured for fluid connection with the second common flow input/output channel 4B, e.g. as illustrated in FIG. 12. This may improve the target loading capabilities of the microfluidic device.

In a particular example, each one of at least a subset of the detection chambers 1; 1A is configured for fluid connection with at least two of the cell capturing channels 2-1, 2-2, and having a respective first selective barrier or filter structure 3A defined between the detection chamber 1; 1A and each of the cell capturing channels 2-1/2-2, e.g. as illustrated in FIG. 13.

For example, each one of at least a subset of the detection chambers 1; 1A may be configured for fluid connection with at least two of the cell capturing channels 2-1, 2-2 for enabling input of identifiable secretions from multiple cell capturing channels into the same detection chamber.

Normally, each one of at least a subset of the cell capturing channels 2 is configured for enabling accommodation of an individual type of cells or individual strain of cells.

The channel 2 may be connected to a specific detection chamber 1; 1A (in which the effects of compounds produced or secreted by the considered type or strain of cells on desired target entities can be studied).

For example, the cell capturing channels of the microfluidic device may be configured for so-called single-cell type growth, also referred to as single-cell growth. Accordingly, each one of at least a subset of the cell capturing channels 2 may be configured for accommodating a single cell at an inner end of the channel and/or configured for excluding other cells in the channel upon growth of such a single cell.

For example, the first common flow input/output channel 4A may include at least two ends, each of which is configured for fluid connection with a respective fluid port, and an intermediate channel section defined between the at least two ends, wherein each of the cell capturing channels 2 is configured for fluid connection with this intermediate channel section, e.g. as illustrated in FIG. 3 or FIG. 4.

By way of example, the second common flow input/output channel 4B may also include at least two ends, each of which is configured for fluid connection with a respective fluid port, and an intermediate channel section defined between the at least two ends, wherein each of the detection chambers 1; 1A is configured for fluid connection with this intermediate channel section, e.g. as illustrated in FIG. 3 or FIG. 4.

Optionally, the detection chambers may be defined as secretion-effect-detection (SED) chambers.

Preferably, the microfluidic device is structurally configured for enabling monitoring, in at least one of the detection chambers 1; 1A or in connection therewith, of target entities interacting with or exposed to at least one compound produced or secreted by the cells and/or monitoring of the compound or compounds and/or monitoring of objects produced by said target entities.

It is even possible to monitor objects such as a thin polymer fiber growing from said target entities and extending at least partly out of from detection chamber and into the common flow channel 4B.

For example, the microfluidic device may include a transparent cover arranged in connection with the substrate for enabling imaging of at least part of the cell capturing channels 2 and/or at least part of the detection chambers 1; 1A and/or at least part of areas in the surrounding of the cell capturing channels and detection chambers.

Alternatively, or as a complement, at least part of the substrate may be transparent for enabling imaging of at least part of the cell capturing channels 2 and/or at least part of the detection chambers 1; 1A and/or at least part of areas in the surrounding of the cell capturing channels and detection chambers.

By way of example, the multiple spatially defined and separated cell capturing channels 2 may be configured for growth of genetic libraries of respective cells or cell strains.

Normally, at least a subset of the multiple spatially defined and separated cell capturing channels 2 may have, in at least part of the channel extension, a channel dimension corresponding to and adapted for capturing respective types of cells or cell strains.

For example, at least a subset of the multiple spatially defined and separated cell capturing channels 2 may have, in a channel section at the inner end of the cell capturing channels 2, a channel dimension corresponding to respective types of cells or cell strains.

In a particular example, especially adapted for so-called single-cell type growth, at least a subset of the multiple spatially defined and separated cell capturing channels (2) may have, in a channel section at the inner end of the cell capturing channels (2), a channel dimension corresponding to a single cell of respective types of cells or cell strains.

It is generally possible to adapt the dimension of the cell capturing channels 2 for cells of different sizes. The length of the cell capturing channels 2 may also be adapted, e.g. in order to affect the number of compound-secreting cells in the channels, which in turn affects the concentration levels of the secreted compounds in the detection chambers. In addition, both the length and width of the cell capturing channels may be adapted to adjust the flow of fluid through the channels 2 and also the associated detection chambers 1; 1A.

In a particular example, at least a subset of the multiple spatially defined and separated cell capturing channels 2 have a wider inflow section with a dimension in connection with the first common flow input/output channel 4A that is larger than a dimension of a channel section at the inner end of the cell capturing channels 2, e.g. as illustrated in FIG. 14.

As an example, the microfluidic device 10 may be configured for transporting, for each of the detection chambers 1; 1A, target entities via a respective access channel 1C interconnecting with the detection chamber at an intersection, initially using liquid flow in a first direction to enable target entities to be transported through the access channel 1C into the detection chamber 1; 1A and then reversing the liquid flow to a second reversed direction to capture at least part of the target entities in a section 1A of the detection chamber 1 arranged downstream of the intersection with the access channel 1C in the second reverse direction towards the second selective barrier or filter structure 3B at the end of the detection chamber.

Preferably, the microfluidic device may be implemented as a microfluidic chip, e.g. using well-accepted manufacturing technologies.

According to a second aspect, there is provided a microfluidic device 10. The microfluidic device 10 comprises a microfluidic structure having multiple spatially defined cell capturing channels 2 configured for enabling growth of cells or genetic libraries of cells or cell strains that are capable of producing or secreting compounds. The microfluidic device is characterized in that the microfluidic structure of the microfluidic device further comprises multiple spatially defined detection chambers 1; 1A configured to receive and accommodate target entities. Each of the detection chambers 1; 1A is configured for fluid connection with at least one of the cell capturing channels 2, and has a selective barrier 3A defined between the detection chamber 1; 1A and the respective cell capturing channel or channels 2 and adapted for allowing flow of at least one of the compounds from the respective cell capturing channel or channels into the detection chamber 1; 1A, enabling the target entities in the detection chamber 1; 1A to be exposed to the compound or compounds, while stopping cells or target entities from passing through the selective barrier 3A. The microfluidic device 10 is structurally configured for enabling monitoring, in at least one of the detection chambers 1; 1A, of the target entities and/or the compound(s) and/or interaction between the target entities and the compound(s).

In the following, the proposed technology will be described with reference to particular, non-limiting examples.

In a sense, the proposed technology may at least in parts be regarded as a secretion-effect-detection microfluidic chip and procedure in which cells or libraries of cells produce and secrete compounds or libraries of compounds where each unique compound flows over a specific group of target entities where the compound or its effect can be characterized, e.g. by imaging. For example, these target entities can be other cells or objects where the binding or activity of the compound can be detected and measured. Different target entities can be loaded according to need.

This constitutes a new microfluidic chip and procedure, e.g. for pooled screening of compounds produced in cells, for example biopharmaceuticals, where the problems of compound production, purification and high-throughput testing may be solved simultaneously.

For efficient implementation, the novel secretion-effect-detection technology proposed herein may be effectively integrated with a so-called cell trapping mother machine. The use of microfluidic mother machine chips for cell characterization have several advantages, in addition to enabling the use of DuMPLING screens. First, a constant flow of fresh medium may be supplied to the cells growing in the traps, ensuring optimal growth for days. Secondly, even though the loading of individual cells into traps is random, isogenic microcolonies in each trap will be created as the innermost cell pushes out any other cells during growth, sometimes referred to as a single-cell type growth. Thirdly, this microenvironment is controllable as the presence of inducers or antibiotics can be regulated with the flow of medium and introduced or removed at will.

The cell traps/channels may have to be adapted in size to certain types of cells. Purely by way of example, a width of ca 4-6 μm for *Pichia pastoris*, or ca 5-10 μm for *Saccharomyces cerevisiae*. To be able to use the chip with different yeast strains growing in different conditions, a range of chips with hundreds or thousands of cell traps with different trap widths may be designed. The cell trap/channel lengths may also be varied, e.g. from 50 to 400 μm. This enables varying the number of cells for optimizing secretion and flow rates.

With reference once again to FIG. 3 and FIG. 4, the microfluidic device 10 such as a microfluidic chip may be regarded as having a number of so-called secretion-effect-detection areas. The secretion-effect-detection areas are here used to illustrate the general design. The number of secretion-effect-detection areas can be varied.

Reference sign 1 may exemplarily be used to show secretion-effect-detection chambers 1 where the target entities are loaded by using regulated flow of liquid.

Reference sign 2 may exemplarily be used to show so-called mother machine cell traps, where, in this particular example, each cell trap is exclusively connected to a specific secretion-effect-detection chamber, into which the cells that produce and secrete the compounds are loaded. The double-edged arrow indicates that liquid flow can occur in both directions.

Reference sign 3 may exemplarily be used to show the barrier or filter in the end of each trap in 2 and in the end of the secretion-effect-detection chamber in 1; 1A.

In a particular example, the barrier 3 allows for passage of liquid. The barrier 3 allows for passage of molecular complexes. The barrier 3 allows for passage of particles smaller than cells. The barrier 3 does not allow for passage of cells. The barrier 3 does not allow for passage of objects similar in size to cells. The barrier 3 may be made from solid pillars. The barrier 3 may be a mesh. The barrier 3 may be a sieve. Other examples of selective barriers or filters may be used.

Reference sign 4 may exemplarily be used to show an open stretched out space that functions as a channel where liquids and entities such as cells or other similar objects can flow in different directions.

Reference sign 5 may exemplarily be used to show open stretched out spaces that function as channels that continue outside the drawing into ports where tubing can be connected and mediate the flow of liquids and entities such as cells or other similar objects. The connected tubing can be used for regulated media flow into the chip or for flowing liquid into waste. The direction and pressure of the flow can be controlled by regulating the flow in and out of different tubing attached to different ports. The double-edged arrows indicate that liquid flow can occur in both directions.

Reference signs 6, 7, and 8 may exemplarily be used to show three secretion-effect-detection areas which are identical in function. For example, these areas may involve the different elements described in 1, 2 and 3. The secretion-effect-detection areas exemplified by 6, 7 and 8 may be present in different numbers. A larger number of secretion-effect-detection areas allows for characterization of a larger number of different secreted compounds. The secretion-effect-detection areas exemplified by 6, 7 and 8 may be of variable sizes, as already discussed.

Figure 15:
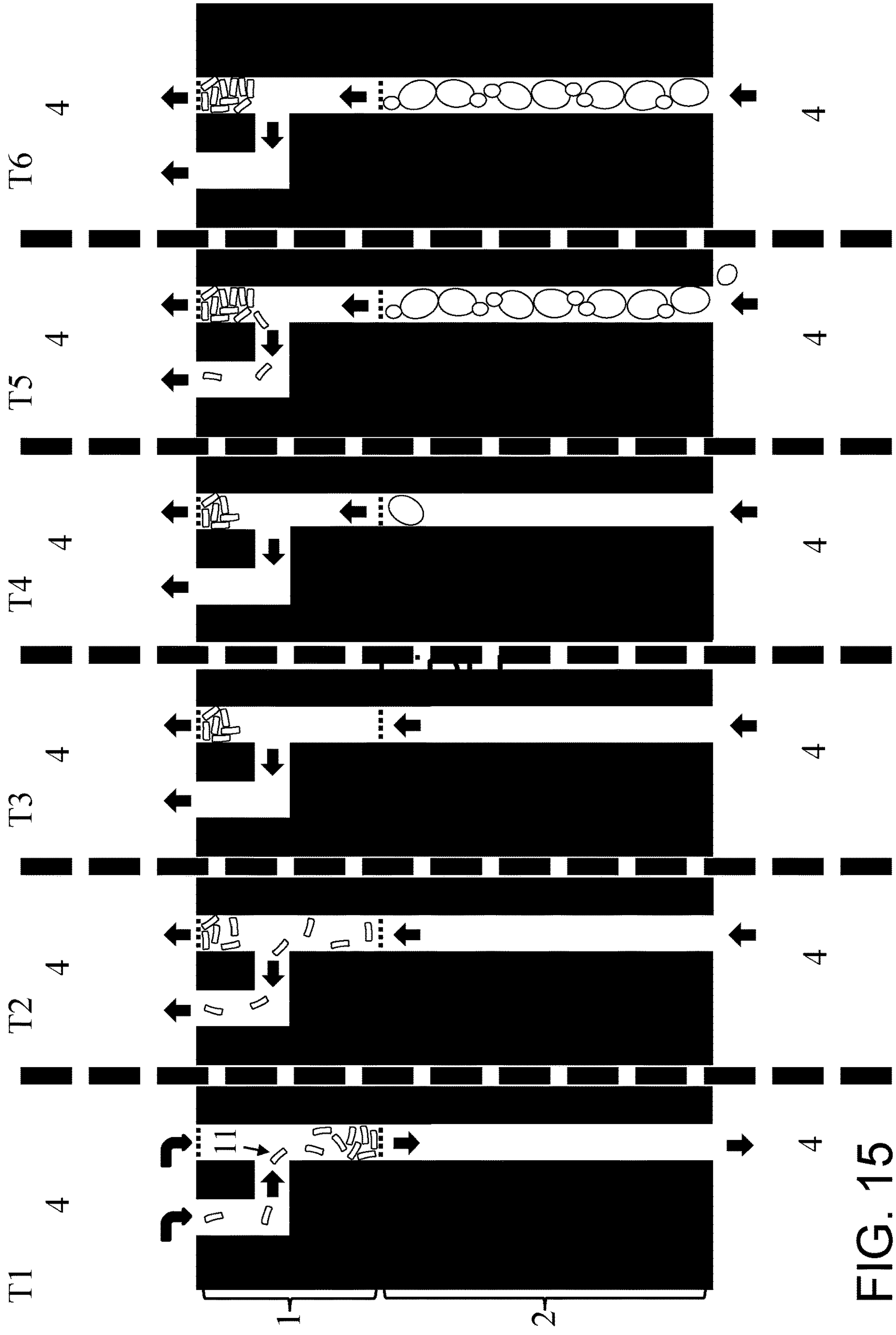
FIG. 15 is a schematic diagram illustrating an example of different phases of the operation of the microfluidic device according to an embodiment, with special focus on what happens in connection with a specific one of the detection chambers and its associated cell capturing channel.

FIG. 15 is a schematic diagram illustrating an example of different phases of the operation of the microfluidic device according to an embodiment, with special focus on what happens in connection with a specific one of the detection chambers and its associated cell capturing channel.

T1 is the first time step. The target entities are loaded into to the secretion-effect-detection chamber by means of a liquid flow from the space (second input/output flow channel 4B) connected to the ports as also illustrated in FIG. 3 and FIG. 4 that brings them through the open space until they accumulate against the barrier at the end of the mother machine cell trap/channel.

T2 is the second time step. The target entities that are accumulated against the barrier are moved by the means of a reversal of the liquid flow towards the barrier at the other end of the secretion-effect-detection chamber. Some target entities escape the secretion-effect-detection chamber the same way they entered.

T3 is the third time step. Some target entities moving with the flow in T2 get trapped against the barrier at the end of the secretion-effect-detection chamber. The flow is kept in the same direction in all further time steps T4, T5 and T6.

T4 is the fourth time step. The compound-producing and secreting cells are loaded into the mother machine cell traps/channels by means of a liquid flow from the space (first input/output flow channel 4A) connected to the ports as also illustrated in FIG. 3 and FIG. 4.

T5 is the fifth time step. The compound-producing and secreting cells loaded in T4 grow until they create isogenic microcolonies. In the case that the target entities are cells they also grow and form a small colony in the secretion-effect-detection chamber.

By way of example, the compound-producing and secreting cells may be imaged and recorded using time-lapse microscopy to establish their phenotypes. The target entities may be imaged and recorded using time-lapse microscopy to establish their characteristics. If not already active, the production and/or secretion of compounds from the compound-producing and secreting cells is/are induced. This induction can be done, e.g. by adding a chemical inducer to the liquid which is flowed to the cells. Alternatively, this induction can be performed by changing the temperature that the cells are exposed to. Yet another way for this induction involves exposing the cells to light.

The produced and secreted compound is carried by the liquid flow to the target entities in the secretion-effect-detection chamber. For example, the phenotypes of the compound-producing and secreting cells may be imaged and recorded using time-lapse microscopy to detect any changes due to the compound. The characteristics of the target entities may be imaged and recorded using time-lapse microscopy to detect any changes due to the compound. Measured phenotypes or characteristics may be cell growth rates. Measured phenotypes or characteristics may be cell morphologies. Measured phenotypes or characteristics may be cell death. Measured phenotypes or characteristics may be the signal of a reporter molecule. Measured phenotypes or characteristics may be the cellular localization of a reporter molecule. Secondary binding agents may be introduced in the liquid flow to bind the compound-affected target entities. A secondary binding agent may be introduced in the liquid flow to bind the compounds that have bound the target entities. This secondary binding agent may be an antibody. This secondary binding agent may be an antibody labelled with reporters to enable microscopy-mediated quantification of binding frequency. This secondary binding agent may be an RNA aptamer. This secondary binding agent may be an RNA aptamer labelled with reporters to enable microscopy-mediated quantification of binding frequency. These reporters may be dyes. These reporters may be fluorescent proteins. These reporters may be enzymes. The secondary binding agent may be a virus.

T6 is the sixth time step. The gathering of imaging data described in T5 is finished. Individual compound-producing and secreting cells whose compound is of interest may be extracted from the mother machine cell trap/channel and extracted from the secretion-effect-detection microfluidic chip, e.g. by using an optical tweezer to put them into a liquid flow leading out to an outlet port. Alternatively, all compound-producing and secreting cells may be extracted by reversing the flow and flushing the cells into a liquid flow leading out to an outlet port. Individual compound producing and secreting cells that carry a unique genetic barcode may be identified by genotyping in situ as described for the DuMPLING method [1], [2]. Barcode genotyping may also be done by in situ sequencing by ligation using the combination of two previously published protocols [6], [7]. By identification of compound-producing and secreting cell genotypes, specific compounds that produce specific effects on the compound-producing and secreting cells themselves or on the target entities may be identified.

Figure 16:
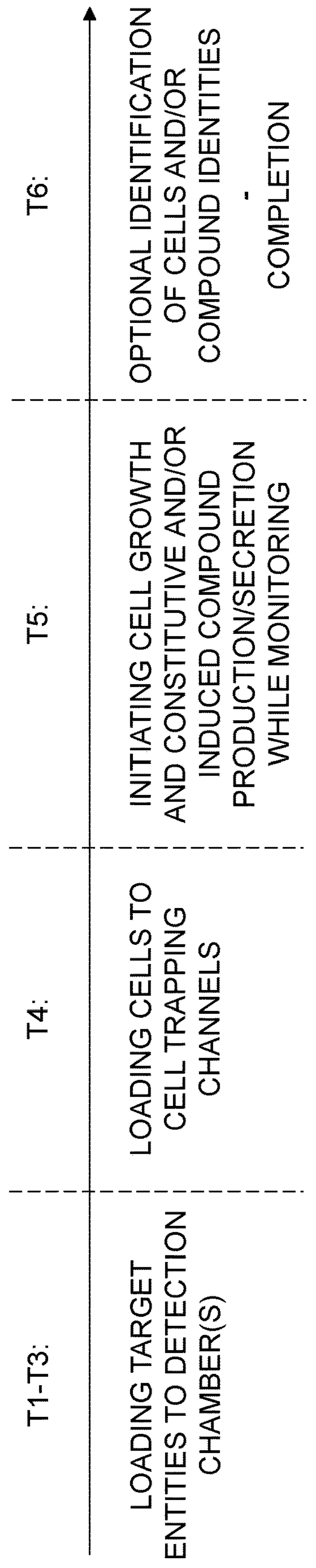
FIG. 16 is a schematic diagram illustrating a complementary example of different phases of the operation of the microfluidic device according to an embodiment.

FIG. 16 is a schematic diagram illustrating a complementary example of different phases of the operation of the microfluidic device according to an embodiment.

The first phase basically corresponds to time steps T1-T3 of FIG. 15 and includes loading of target entities to detection chamber(s).

The second phase corresponds to time step T4 of FIG. 15 and includes loading of cells to cell trapping channels.

The third phase corresponds to time step T5 of FIG. 15 and includes initiating cell growth and constitutive and/or induced compound production/secretion while monitoring.

The fourth phase corresponds to time step T6 of FIG. 15 and includes optional identification of cells and/or compound identities.

Figure 17:
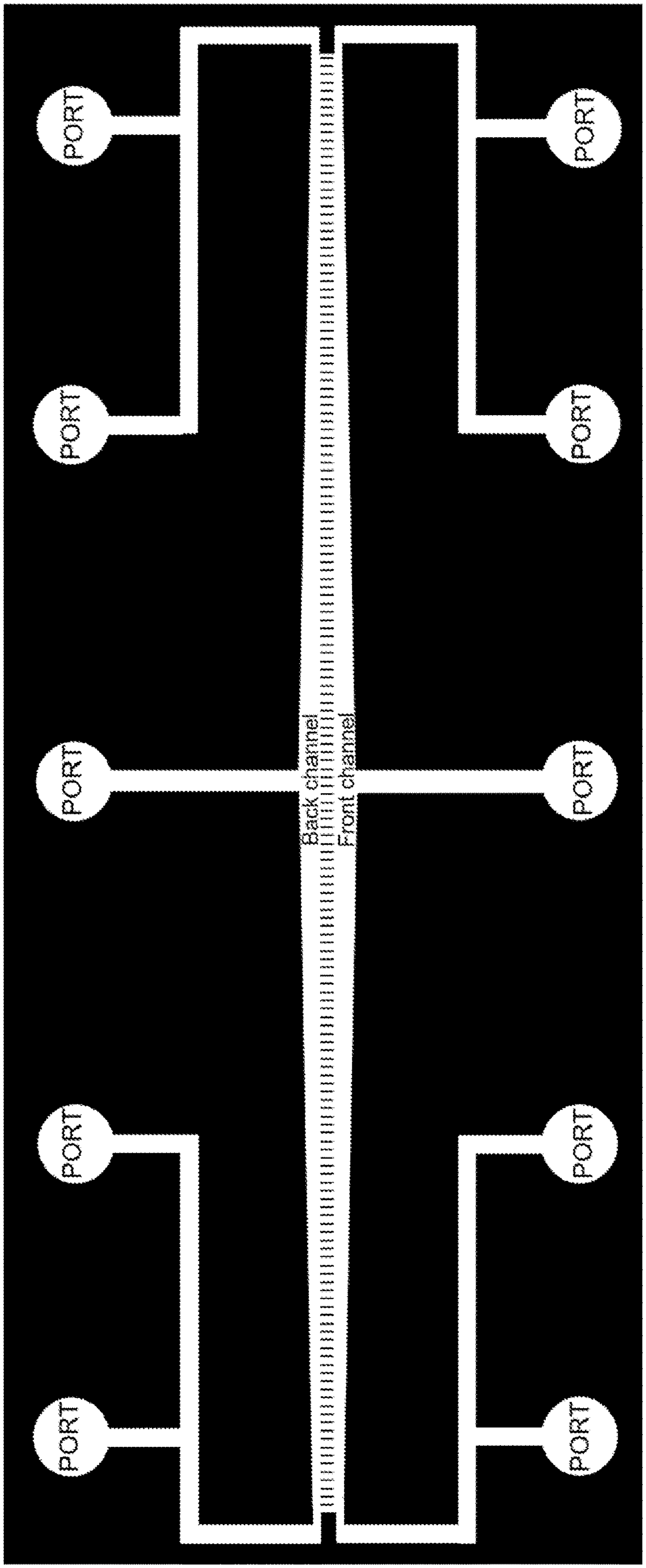
FIG. 17 is a schematic diagram illustrating an example of an overview of a microfluidic device including a so-called mother machine with integrated cell capturing channels and associated detection chambers, as well as back and front channels and input/output ports for fluid and/or relevant objects such as cells and target entities.

FIG. 17 is a schematic diagram illustrating an example of an overview of a microfluidic device including, in the center, a so-called mother machine with integrated cell capturing channels and associated detection chambers, as well as back and front channels and input/output ports for fluid and/or relevant objects such as cells and target entities.

For example, the compounds made by the compound-producing and secreting cells may be any compound that can be produced and secreted by a living cell. The produced and secreted compound may be a biopharmaceutical. The produced and secreted compound may be a protein. The produced and secreted compound may be a small peptide. The produced and secreted compound may be an antimicrobial peptide. The produced and secreted compound may be a protein complex. The produced and secreted compound may be a DNA molecule. The produced and secreted compound may be an RNA molecule. The produced and secreted compound may be a cell metabolite. The produced and secreted compound may be a virus. The produced and secreted compound may be a combination of protein and nucleic acids. Other examples will be given later on.

By way of example, the target entities can be cells. The cells can be yeast. The cells can be bacteria. The cells can be mammalian. The cells can be insect cells. The cells can be plant cells. The cells can be mammalian-derived cell-lines. Alternatively, the target entities can be beads. The target entities can be beads labelled with antibodies. The target entities can be beads labelled with DNA. The target entities can be beads labelled with DNA oligonucleotides. The target entities can be beads labelled with RNA. The target entities can be beads labelled with RNA oligonucleotides. The target entities can be beads labelled with peptides. Other examples will be given later on.

For example, the compound-producing and secreting cells can be yeast. The cells can be bacteria. The cells can be mammalian. The cells can be insect cells. The cells can be plant cells. The cells can be mammalian-derived cell-lines. Other examples will be given later on.

For example, time-lapse microscopy may be used to detect antibiotic efficiency on target bacteria and any unwanted toxicity against eukaryotic yeast production cells.

An alternative for the identification of producing/secreting cells in situ in the chip, using for instance genotyping as in the DuMPLING method, is to isolate cells whose compounds have desired properties and then identify these cells using other methods outside the chip. Methods for isolation of cells include (i) extracting cells using optical tweezers and delivering them through a clean port and a clean tubing to a clean container like a test tube, (ii) killing all cells with non-desired properties or that produce compounds with no desired properties using an optical light-based system, for instance strong light from a laser that induces heat or DNA damage that kills the cells, and then isolate the only remaining viable and thus growing cells through a flow outlet or even the flow waste tubing into a clean container like a test tube, or (iii) mechanical manipulations to extract individual cells for instance by piercing the chip material using a hollow needle and a syringe, or a similar device, and extracting the cells using a pressure difference, into a clean container like a test tube, or (iv) using pre-configured ports with tubing that are attached to each channel with producing/secreting cells and can be selectively opened, allowing for the extraction of individual cell strains with a flow into a clean container like a test tube. Methods for isolation of producing/secreting cells could also be combinations or (i), (ii), (iii) and (iv) or combinations of elements of these methods.

Once cells are isolated, they could be identified outside the chip using standard laboratory methods such as for example PCR, PCR combined with sequencing of the PCR products, through the binding of molecular probes to the cells, for example FISH probes, combined with detection of bound probes, for example by imaging, or by other methods for the unique identification of the presence of specific proteins or nucleic acid sequences in the cells such as immunobased methods or methods that incorporates other types of amplification and detection of specific nucleic acids, for example LAMP or RCA-based methods.

Figure 18:
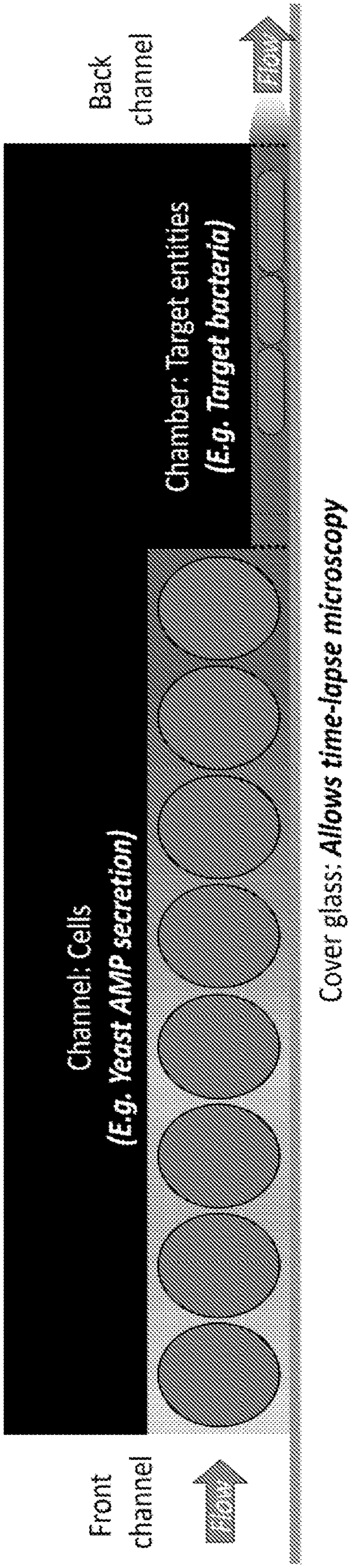
FIG. 18 is a schematic diagram illustrating an example of a single microfluidic cell capturing channel that is integrally formed with a detection chamber, which is in direct fluid connection with the cell capturing channel, but with a selective membrane or filter structure in-between the channel and the chamber, as well as a selective membrane or filter structure at the end of the target chamber.

FIG. 18 is a schematic diagram illustrating an example of a single microfluidic cell capturing channel that is integrally formed with a detection chamber, which is in direct fluid connection with the cell capturing channel, but with a selective membrane or filter structure in-between the channel and the chamber, as well as a selective membrane or filter structure at the end of the target chamber.

By way of example, the cell capturing channel or cell trap may be filled with compound-secreting cells, e.g. yeast cells that when grown produce or secrete specific antimicrobial peptide (AMP) molecules, into the liquid medium or fluid. The secreted compounds (such as AMPs) are carried with the medium flow to the detection chamber containing target entities (e.g. target bacteria) where the effects of the compounds on the target entities may be evaluated, e.g. by time-lapse microscopy through a cover glass.

Many AMPs have been successfully expressed in and secreted from yeasts, as reviewed in [8]. While yeast strains can be grown for over 70 generations in microfluidic compartments [9], there are currently no microfluidic technologies that allow for the screening of AMPs secreted from libraries of yeast. There are, however, microfluidic chips that allow for the study of secreted protein effects on other cells. For instance, designs exist where two to five single cells can be placed near each other, thus allowing secretions to affect nearby cells [10,11,12]. These designs are excellent for studying immune cell-to-cell interactions or cytotoxicity, but for many reasons they are not suitable for screening of pooled libraries of strains secreting peptide antibiotics.

Previous studies measured protein secretion rates per cell mass and hour in fed-batch cultures of the yeast *Pichia pastoris* [13, 14, 15]. As part of a feasibility study by the present inventor, it was possible to estimate the maximum secretion rate that [14] and [15] could achieve to about 50 proteins per cell and second, by using each protein's molecular weight and a mean value of single yeast cell mass (https://bionumbers.hms.harvard.edu/). However, as compounds like AMPs are much smaller in mass and less complex than these proteins, it is reasonable to assume that secretion of smaller compounds like AMPs could occur at a higher rate. Further, cells in a microfluidic trap/channel can maintain maximum growth rates due to the flow-replenished medium and the gas-permeable PDMS polymer chip [16]. As chip conditions are expected to be optimal for yeast growth, and protein secretion primarily seems to occur at the growing yeast bud [17], secretion conditions are also expected to be optimal. Thus, it can as an example be assumed that AMP expression and secretion rates could be optimized to an average of 250 molecules per cell and second. Haploid cells of *P. pastoris*, for example, are approximate spheres with a mean diameter of 4 μm, allowing calculation of a cell's volume. Thus, the microfluidic yeast channel traps could be designed as long rectangles with a short side of 6 μm. Accordingly, for a cell row, the volume of medium per cell in one trap can be estimated. Then, the concentration of secreted AMPs in the end of the trap will be decided by the number of cells secreting into the flow, and the flow rate of medium passing through the channel. Both factors will be optimized by varying the microfluidic chip design and medium pump pressure. With the assumption of a flow rate of 110.5 fL/s, which displaces the volume surrounding a single yeast cell every second, and 30 or 100 cells in one trap, the final AMP concentration becomes 0.11 or 0.38 μmole/L. This concentration could be further increased by carefully reducing the flow rate. Two efficient AMPs, Oncocin and LL-37, have MICs of 0.42 and 1.5 μmole/L [18, 19] and it is thus realistic to reach these MIC levels in a microfluidic secretion-effect-detection (SED) chip. However, it is not necessary to reach MIC levels to quantify antibiotic effects for screening purposes. Minute changes in growth rates due to sub-MIC concentrations of AMPs can be detected with time-lapse microscopy [16]. Hence, it will be possible to quantify the antibiotic effects of also less potent AMPs during SED screening.

Figure 19:
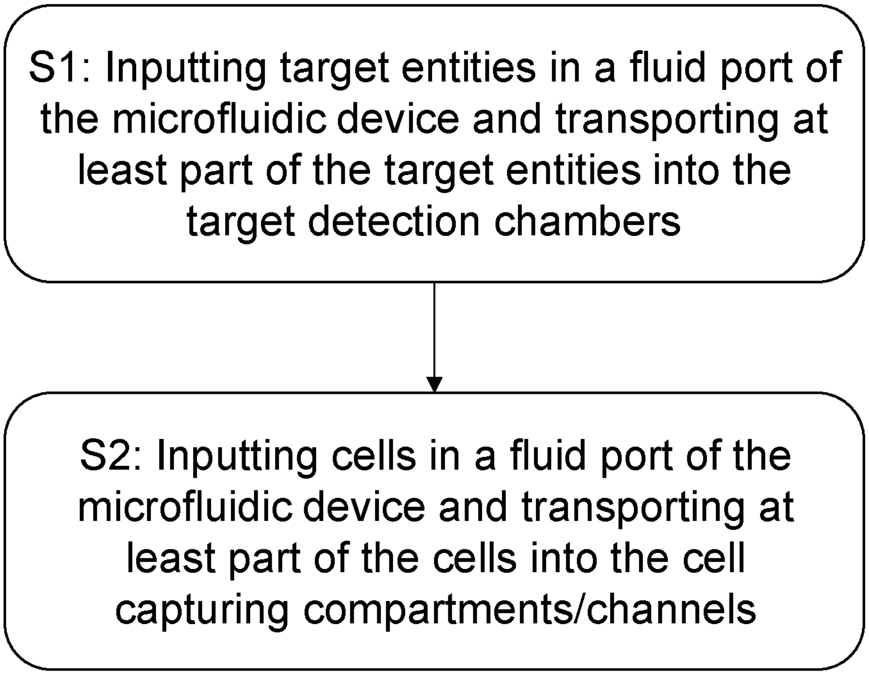
FIG. 19 is a schematic diagram illustrating an example of a method for loading a microfluidic device.

FIG. 19 is a schematic diagram illustrating an example of a method for loading a microfluidic device. The method comprises:

- S1: inputting target entities in a fluid port of the microfluidic device and transporting at least part of the target entities into the detection chambers through liquid flow; and
- S2: inputting cells in a fluid port of the microfluidic device and transporting at least part of the cells into the cell capturing channels through liquid flow.

In a particular example, the step of inputting target entities in a fluid port of the microfluidic device and transporting at least part of the target entities into the detection chambers 1; 1A through liquid flow comprises:

- transporting, for each of the detection chambers, target entities via a respective access channel 1C interconnecting with the detection chamber 1; 1A at an intersection, initially using liquid flow in a first direction to enable target entities to be transported through the access channel 1C into the detection chamber 1; 1A, and
- subsequently reversing the liquid flow to a second reversed direction to capture at least part of the target entities in a section 1A of the detection chamber 1; 1A arranged downstream of the intersection with the access channel 1C in the second reverse direction towards the second selective barrier or filter structure 3B at the end of the detection chamber 1.

Figure 20:
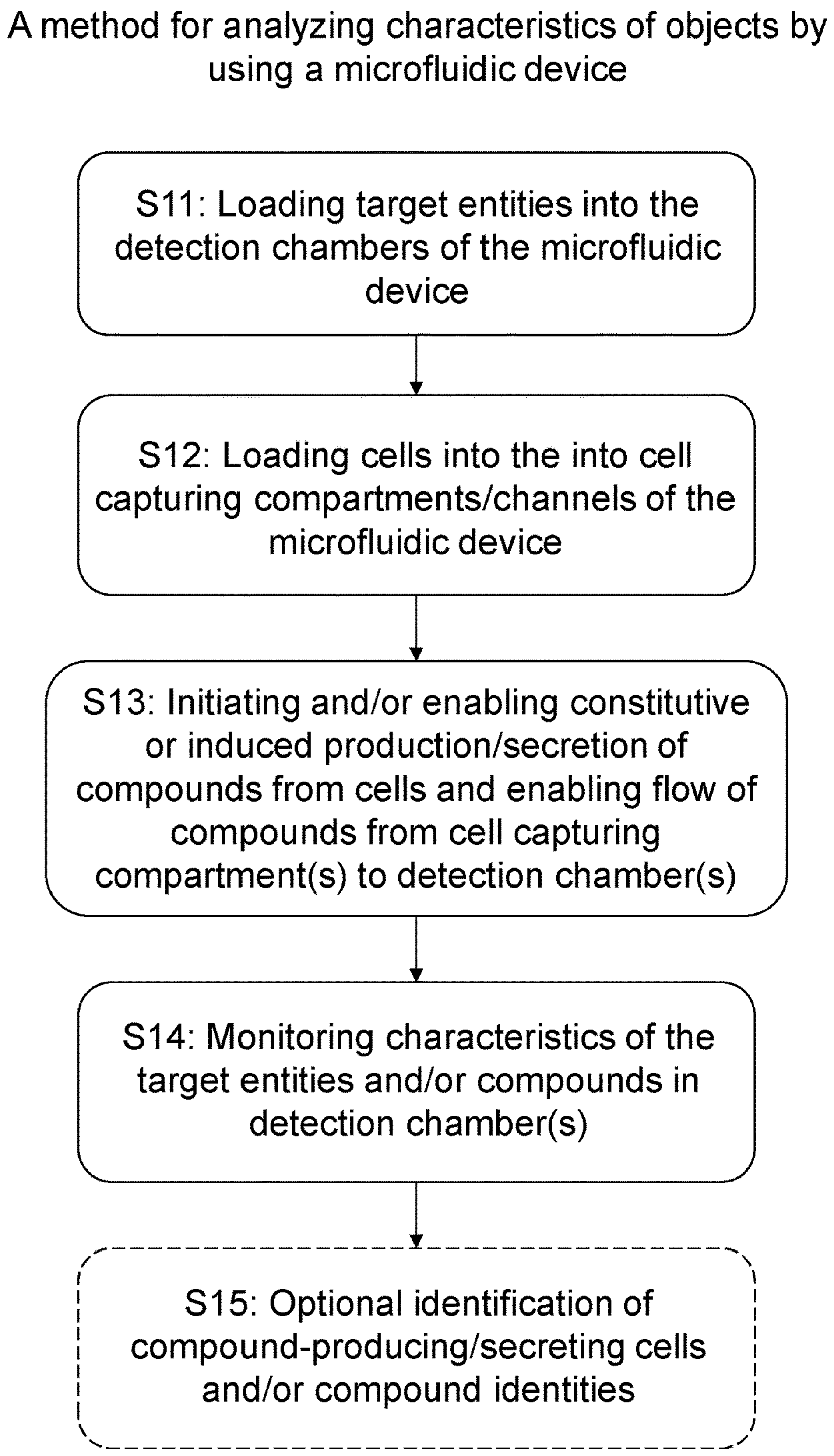
FIG. 20 is a schematic diagram illustrating an example of a method for analyzing characteristics of objects such as cells, target entities and/or compounds by using a microfluidic device.

FIG. 20 is a schematic diagram illustrating an example of a method for analyzing characteristics of objects such as cells, target entities and/or compounds by using a microfluidic device.

Basically, the method comprises:

- S11: loading target entities into the detection chambers of the microfluidic device;
- S12: loading cells into the into cell capturing channels of the microfluidic device;
- S13: initiating and/or enabling constitutive or induced production/secretion of compounds from cells and enabling flow of compounds from cell capturing channel(s) to at least a subset of the detection chambers; and
- S14: monitoring characteristics of target entities and/or compounds in at least a subset of the detection chambers.

By way of example, single-cell type growth may be performed in at least a subset of said cell capturing channels 2, whereby a single cell is grown at an inner end of the channels.

In a particular example, the step of loading target entities into the detection chambers of the microfluidic device comprises:

- loading, for each of the detection chambers 1; 1A, target entities via a respective access channel 1C interconnecting with the detection chamber 1; 1A at an intersection, initially using liquid flow in a first direction to enable target entities to be transported through the access channel 1C into the detection chamber 1; 1A, and
- subsequently reversing the liquid flow to a second reversed direction to capture at least part of the target entities in a section 1A of the detection chamber 1; 1A arranged downstream of the intersection with the access channel 1C in the second reverse direction towards the second selective barrier or filter structure 3B at the end of the detection chamber 1; 1A.

Optionally, the method further comprises identification S15 of compound-producing/secreting cells and/or compound identities.

By way of example, the target entities may include at least one of the following:

- target cells,
- target bacteria,
- prokaryotic cells,
- eukaryotic cells,
- derived cell lines or cell strains,
- animal or human patient-derived cells,
- virus particles,
- particles made up by complexes of proteins and/or nucleic acids and/or lipids,
- inanimate objects in general or inanimate objects capable of a detectable change in characteristics upon interaction with or binding of compounds, and
- particles composed of polymers, metals, mixes of different materials, or other substances, that are unmodified or modified to interact with or bind compounds.

For example, the target entities may include cancer cells, virus-infected cells, parasite-infected cells or bacteria-infected cells.

As an example, the compounds may include at least one of the following:

- antimicrobials,
- immunomodulatory compounds,
- structure-forming compounds,
- antivirals,
- antiparasitics,
- anticancer compounds,
- hormones,
- receptor binding compounds,
- anti-biofilm compounds,
- gene expression modulating compounds,
- epigenetic-modulating compounds,
- enzymatic compounds with a detectable activity on the target entities or other compounds that interact with the target entities,
- oxidizing or reducing compounds,
- inhibitors of enzymes,
- inhibitors of protein interactions,
- inhibitors of protein-nucleic acid interactions,
- compounds that form polymers, and
- compounds that form complexes with themselves or other compounds.

As mentioned, there is also provided an analysis system 100 such as that shown in FIG. 2 comprising a microfluidic device 10 as described herein.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

[1] Camsund, Lawson et al. (2020), Time-resolved Imaging-based CRISPRi Screening. Nat Meth 17, 86-92.
[2] Lawson, Camsund et al. (2017), In situ Genotyping of a Pooled Strain Library after Characterizing Complex Phenotypes. Mol Syst Biol 13:947.
[3] U.S. Pat. No. 10,041,104.
[4] US 2020/0316600 A1.
[5] U.S. Pat. No. 9,115,340.
[6] Larsson, Koch et al. (2004), In situ Genotyping Individual DNA Molecules by Target-primed Rolling-circle Amplification of Padlock Probes. Nat Meth 1:3.
[7] Ke, Mignardi et al. (2013), In situ Sequencing for RNA Analysis in Preserved Tissue and Cells. Nat Meth 10:9.
[8] Deng, Ge et al. (2017) Prot Expr Pur 140, 52-9.
[9] Xu, Fallet et al. (2015) Nat Comm 6:7680.
[10] Zhou, Shao et al. (2020) Cell rep 31, 107574.
[11] Li, Jang et al. (2017) Adv Biosys 1, 1700085.
[12] Dura, Dougan et al. (2015) Nat Comm 6:5940.
[13] Zhang, Sinha et al. (2005) Biotechnol Prog 21, 386-93.
[14] Paulova, Hyka et al. (2012) J Biotech 157, 180-8.
[15] Khasa, Khushoo et al. (2007) Biotechnol Lett 29, 1903-8.
[16] Baltekin, Boucharin et al. (2017) PNAS 114:34, 9170-75.
[17] Puxbaum, Gasser et al. (2016) Appl Microbiol Biotechnol 100:8159-68.
[18] Knappe, Piantavigna et al. (2010) J Med Chem 53, 5240-7.
[19] Silva, Fensterseifer et al. (2015) Antimicrob Agents Chemother 59:1620-6.

The invention claimed is:

1. A microfluidic device comprising:

a substrate having:

multiple spatially defined and separated cell capturing channels configured to receive and accommodate cells, wherein each of said cell capturing channels is configured for fluid connection with a first common flow input/output channel via a first fluid port of the substrate, wherein said substrate of said microfluidic device further comprises multiple spatially defined and separated detection chambers configured to receive and accommodate target entities, wherein each of said detection chambers is in direct fluid connection with at least one of said cell capturing channels, and having a first selective barrier or filter structure defined between the detection chamber and the respective cell capturing channel or channels and adapted for allowing passage of fluid and objects smaller than a first dimension, while hindering passage of objects equal to or larger than said first dimension to pass through said first selective barrier or filter structure, wherein each of said detection chambers is further configured for fluid connection with a second common flow input/output channel via a second fluid port of the substrate, and having a second selective barrier or filter structure defined between the detection chamber and said second common flow input/output channel and adapted for allowing passage of fluid and objects smaller than a second dimension into said second common flow input/output channel, while hindering passage of objects equal to or larger than said second dimension to pass through said second selective barrier or filter structure.

2. The microfluidic device of claim 1, wherein said first selective barrier or filter structure is adapted for allowing passage of fluid and objects, including at least one compound produced or secreted by said cells, that are smaller than said cells and said target entities, while hindering passage of cells and target entities to pass through said first selective barrier or filter structure.

3. The microfluidic device of claim 2, wherein said objects that are smaller than said cells and said target entities include molecules, molecular complexes, particles, compounds.

4. The microfluidic device of claim 1, wherein said second selective barrier or filter structure is adapted for allowing passage of fluid and objects smaller than said target entities into said second common flow input/output channel, while hindering passage of target entities to pass through said second selective barrier or filter structure.

5. The microfluidic device of claim 4, wherein said objects that are smaller than said target entities include molecules, molecular complexes, particles, compounds.

6. The microfluidic device of claim 1, wherein said microfluidic device is adapted and dimensioned so as to enable accommodation of said cells, said compounds and said target entities.

7. The microfluidic device of claim 1, wherein each one of at least a subset of said detection chambers has an access port for enabling loading of said target entities into said detection chambers.

8. The microfluidic device of claim 1, wherein each one of at least a subset of said detection chambers has at least one access channel configured for fluid connection with the detection chamber and configured for fluid connection with the second common flow input/output channel.

9. The microfluidic device of claim 8, wherein each one of at least a subset of said detection chambers has multiple access channels configured for fluid connection with the detection chamber and configured for fluid connection with the second common flow input/output channel.

10. The microfluidic device of claim 1, wherein each one of at least a subset of said detection chambers is configured for fluid connection with at least two of said cell capturing channels, and having a respective first selective barrier or filter structure defined between the detection chamber and each of the cell capturing channels.

11. The microfluidic device of claim 10, wherein each one of at least a subset of said detection chambers is configured for fluid connection with at least two of said cell capturing channels for enabling input of identifiable secretions from multiple cell capturing channels into the same detection chamber.

12. The microfluidic device of claim 1, wherein each one of at least a subset of said cell capturing channels is configured for accommodating an individual type of cells or individual strain of cells.

13. The microfluidic device of claim 1, wherein each one of at least a subset of said cell capturing channels is configured for accommodating a single cell at an inner end of the channel closest to the first selective barrier and/or configured for excluding cells of other linages in the channel upon growth of said single cell.

14. A method for loading a microfluidic device, the microfluidic device comprising a substrate having multiple spatially defined and separated cell capturing channels configured to receive and accommodate cells, wherein each of said cell capturing channels is configured for fluid connection with a first common flow input/output channel via a first fluid port of the substrate, wherein said substrate of said microfluidic device further comprises multiple spatially defined and separated detection chambers configured to receive and accommodate target entities, wherein each of said detection chambers is in direct fluid connection with at least one of said cell capturing channels, and having a first selective barrier or filter structure defined between the detection chamber and the respective cell capturing channel or channels and adapted for allowing passage of fluid and objects smaller than a first dimension, while hindering passage of objects equal to or larger than said first dimension to pass through said first selective barrier or filter structure, wherein each of said detection chambers is further configured for fluid connection with a second common flow input/output channel via a second fluid port of the substrate, and having a second selective barrier or filter structure defined between the detection chamber and said second common flow input/output channel and adapted for allowing passage of fluid and objects smaller than a second dimension into said second common flow input/output channel, while hindering passage of objects equal to or larger than said second dimension to pass through said second selective barrier or filter structure;

wherein microfluidic device comprises a substrate having multiple spatially defined and separated cell capturing channels configured to receive and accommodate cells, wherein each of said cell capturing channels is configured for fluid connection with a first common flow input/output channel via a first fluid port of the substrate, wherein said substrate of said microfluidic device further comprises multiple spatially defined and separated detection chambers configured to receive and accommodate target entities, wherein each of said detection chambers is in direct fluid connection with at least one of said cell capturing channels, and having a first selective barrier or filter structure defined between the detection chamber and the respective cell capturing channel or channels and adapted for allowing passage of fluid and objects smaller than a first dimension, while hindering passage of objects equal to or larger than said first dimension to pass through said first selective barrier or filter structure, wherein each of said detection chambers is further configured for fluid connection with a second common flow input/output channel via a second fluid port of the substrate, and having a second selective barrier or filter structure defined between the detection chamber and said second common flow input/output channel and adapted for allowing passage of fluid and objects smaller than a second dimension into said second common flow input/output channel, while hindering passage of objects equal to or larger than said second dimension to pass through said second selective barrier or filter structure, wherein said method comprising:

inputting target entities in the second fluid port of the microfluidic device and transporting at least part of the target entities into the detection chambers through liquid flow; and inputting cells in the first fluid port of the microfluidic device and transporting at least part of the cells into the cell capturing channels through liquid flow.

15. The method of claim 14, wherein the step of inputting target entities in the second fluid port of the microfluidic device and transporting at least part of the target entities into the detection chambers through liquid flow comprises transporting, for each of the detection chambers, target entities via a respective access channel interconnecting with the detection chamber at an intersection, initially using liquid flow in a first direction to enable target entities to be transported through the access channel into the detection chamber and then reversing the liquid flow to a second reversed direction to capture at least part of the target entities in a section of the detection chamber arranged downstream of the intersection with the access channel in the second reverse direction towards the second selective barrier or filter structure at the end of the detection chamber.

16. A method for analyzing characteristics of cells, target entities and/or compounds by using a microfluidic device according to claim 1, wherein said method comprises:

loading target entities into the detection chambers of the microfluidic device;

loading a library of genetically diverse cells into the into cell capturing channels of the microfluidic device;

initiating and/or enabling constitutive or induced production/secretion of compounds from cells and enabling flow of compounds from cell capturing channel(s) to at least a subset of the detection chambers; and monitoring characteristics of target entities and/or compounds in at least a subset of the detection chambers.

17. The method of claim 16, wherein single-cell growth measurement is performed in at least a subset of said detection chambers harboring cells as target entities.

18. The method of claim 16, wherein the step of loading target entities into the detection chambers of the microfluidic device comprises loading, for each of the detection chambers, target entities via a respective access channel interconnecting with the detection chamber at an intersection, initially using liquid flow in a first direction to enable target entities to be transported through the access channel into the detection chamber and then reversing the liquid flow to a second reversed direction to capture at least part of the target entities in a section of the detection chamber arranged downstream of the intersection with the access channel in the second reverse direction towards the second selective barrier or filter structure at the end of the detection chamber.

19. The method of claim 16, further comprising identification of compound-producing/secreting cells and/or compound identities in all or a subset of the capturing channels.

20. An analysis system comprising a microfluidic device according to claim 1.

* * * * *